(12) United States Patent
Yano et al.

(10) Patent No.: US 6,244,681 B1
(45) Date of Patent: *Jun. 12, 2001

(54) APPARATUS FOR MAKING A HALFTONE RECORDING AND PROCESS FOR MAKING A HALFTONE RECORDING USING THE SAME, AS WELL AS INK TANK AND HEAD CARTRIDGE FIT FOR HALFTONE RECORDING AND INK-JET RECORDING APPARATUS USING THE SAME

(75) Inventors: Kentaro Yano; Naoji Otsuka, both of Yokohama; Kiichiro Takahashi; Hitoshi Nishikori, both of Kawasaki; Osamu Iwasaki, Tokyo; Daigoro Kanematsu, Yokohama; Hidehiko Kanda, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/844,853

(22) Filed: Apr. 22, 1997

(30) Foreign Application Priority Data

Apr. 23, 1996 (JP) .................................................. 8-101687

(51) Int. Cl.[7] .................................................. B41J 2/205
(52) U.S. Cl. .................................................. 347/15
(58) Field of Search ...................... 347/15, 43, 40, 347/8, 37, 41, 11, 12, 13, 42, 9; 358/75, 80, 298

(56) References Cited

U.S. PATENT DOCUMENTS

| 4,313,124 | 1/1982 | Hara . |
|---|---|---|
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,833,491 | * 5/1989 | Rezanka et al. ................. 347/43 |
| 5,142,374 | * 8/1992 | Tajika et al. ................. 347/15 |

FOREIGN PATENT DOCUMENTS

| 54-56847 | 5/1979 | (JP) . |
|---|---|---|
| 59-123670 | 7/1984 | (JP) . |
| 59-138461 | 8/1984 | (JP) . |
| 60-71260 | 4/1985 | (JP) . |

* cited by examiner

Primary Examiner—John Barlow
Assistant Examiner—Charles W. Stewart, Jr.
(74) Attorney, Agent, or Firm—Fitzpatrick, Cella, Harper & Scinto

(57) ABSTRACT

The purpose is to provide a high quality halftone recording with a reduced grainy feeling without lowering the true resolving power. Provided is an apparatus for making a halftone recording by employing three or more types of color materials, each of which has at least one grade of concentration, wherein each type of the color materials having the lowest concentration provides, when recording on a recording medium having a first lightness, a recorded region having its own lightness, and wherein a difference between the first lightness and the lightness of the recorded region is not more than 35, the lightness being measured according to the definition of CIE 1976 psychological measurement lightness using a standard illuminating light D65 as a light source.

48 Claims, 17 Drawing Sheets

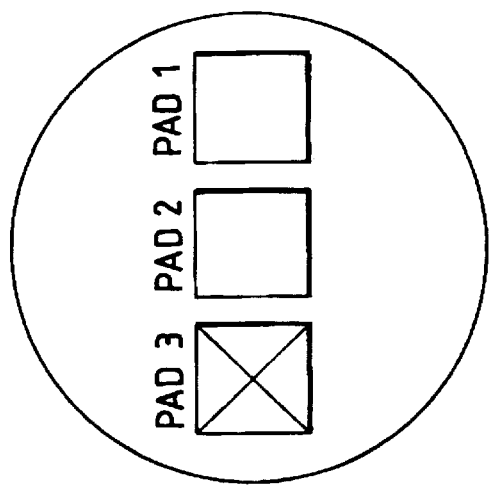
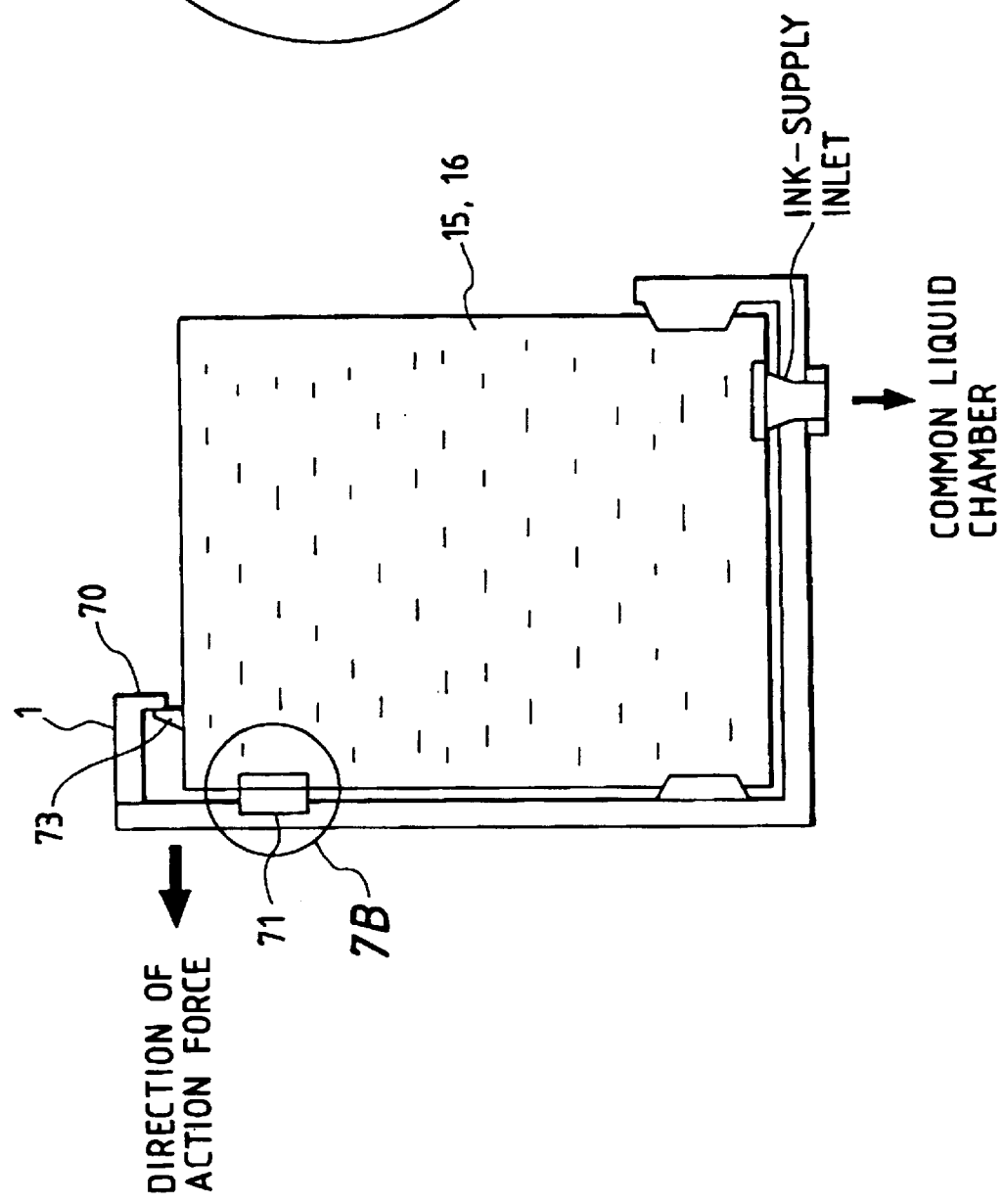

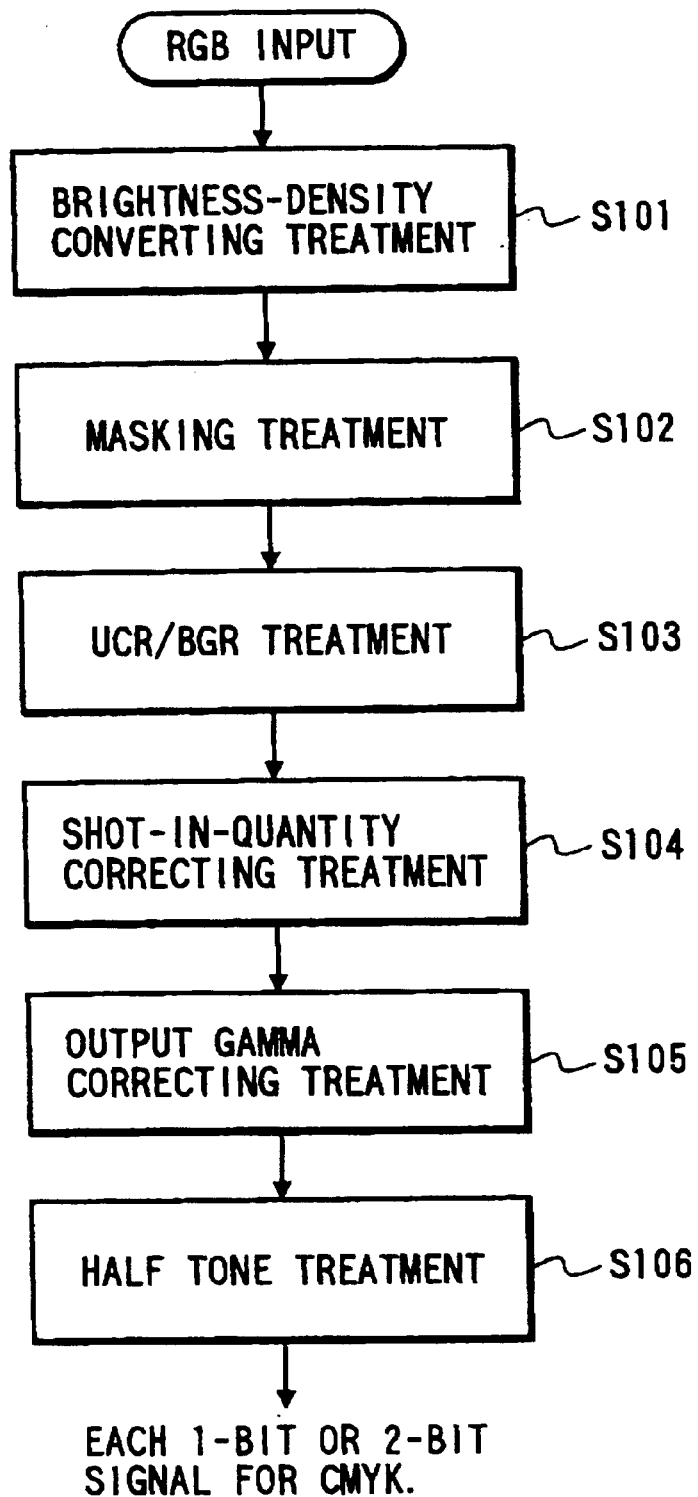

FIG. 10

| ID | CONCENTRATION OF COLORING MATTER | DATA | MAXIMUM PRINTING AMOUNT | CORRESPONDING RECORDING MEDIA |
|---|---|---|---|---|
| 1 | Y 2.5% BY wt.<br>M 3.0% BY wt.<br>C 2.7% BY wt.<br>K 2.6% BY wt. | 360×360dpi<br>-BINARY | C 100% R 200%<br>M 100% G 200%<br>Y 100% B 200%<br>K 100% | PLAIN PAPER<br>COATED PAPER<br>PICTORIAL PAPER |
| 2 | Y 2.5% BY wt.<br>M 1.0% BY wt.<br>C 0.9% BY wt.<br>K 1.3% BY wt. | 360×360dpi<br>4-VALUE | C 300% R 400%<br>M 300% G 400%<br>Y 100% B 400%<br>K 200% | COATED PAPER<br>PICTORIAL PAPER |
| 3 | Y 2.5% BY wt.<br>M 0.8% BY wt.<br>C 0.7% BY wt.<br>K 0.9% BY wt. | 360×360dpi<br>5-VALUE | C 400% R 500%<br>M 400% G 500%<br>Y 100% B 500%<br>K 300% | PICTORIAL PAPER |

FIG. 12A

| 360 dpi BINARY | | |
|---|---|---|
| 0 | × | ○ |
| 1 | ○ | |

FIG. 12B

| 360 dpi 4-VALUE | | | | |
|---|---|---|---|---|
| 0 | × | × | ○ | ◎ |
| 0 | × | × | ○ | ○ |
| 0 | ○ | 1 | ○ | |
| 1 | ○ | ○ | 1 | 1 |

FIG. 12C

| 360 dpi 5-VALUE | | | | | |
|---|---|---|---|---|---|
| | × | ○ | ○ | ◎ | ◎ |
| | × | × | ○ | ○ | ◎ |
| 0 | 0 | 1 | 0 | 1 | 1 |
| 0 | 0 | 0 | 1 | 1 | 1 |
| 0 | 0 | 0 | 1 | 1 | 1 |
| 0 | 0 | 0 | 0 | 1 | 1 |

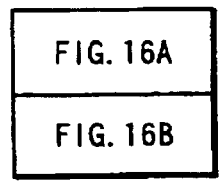
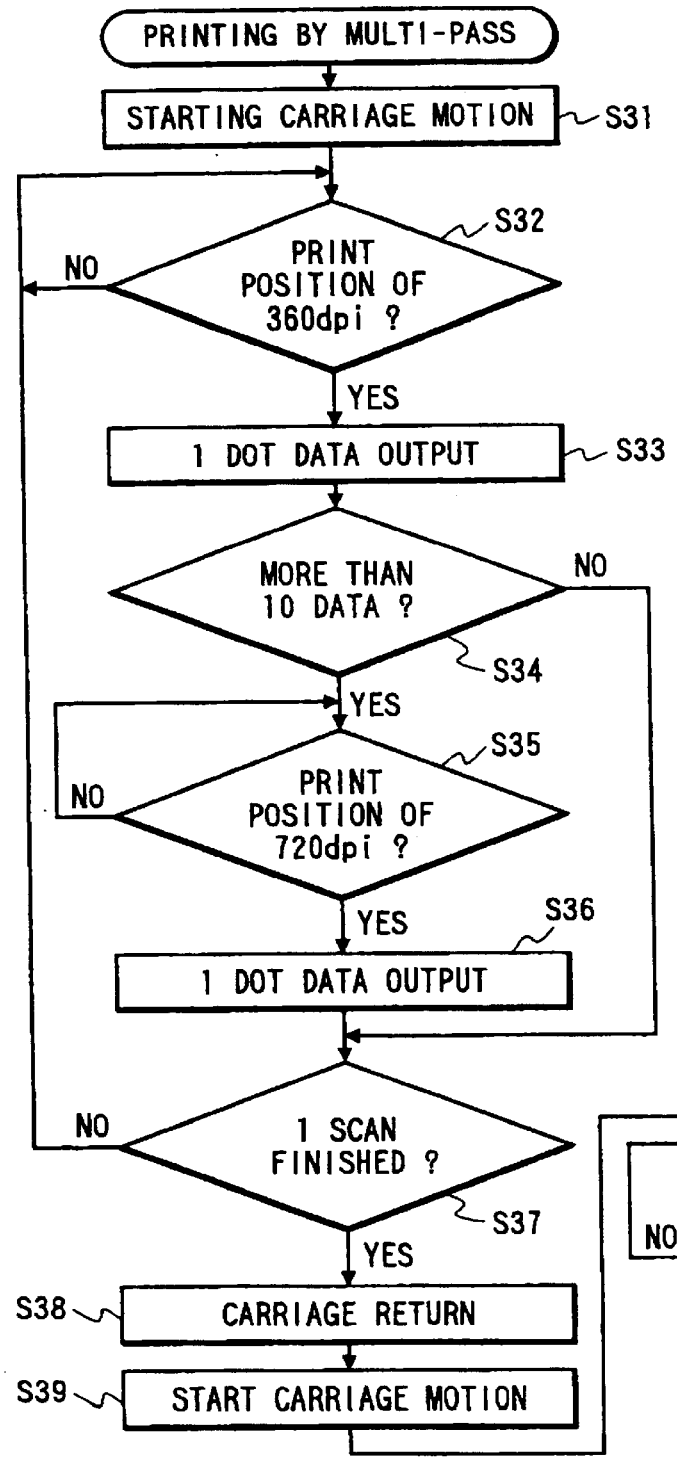
FIG. 16A

APPARATUS FOR MAKING A HALFTONE RECORDING AND PROCESS FOR MAKING A HALFTONE RECORDING USING THE SAME, AS WELL AS INK TANK AND HEAD CARTRIDGE FIT FOR HALFTONE RECORDING AND INK-JET RECORDING APPARATUS USING THE SAME

BACKGROUND OF THE INVENTION

1. Field of the Invention

The present invention relates to a process for making a halftone recording for recording a high quality image with a suppressed grainy feeling, as well as an ink tank and a head cartridge fit for halftone recording and an ink-jet apparatus using the same.

2. Related Background Art

Recently, OA instruments such as personal computers and word processors have widely spread, thereby rapidly increasing a chance of using such equipment to output not only so-called binary images such as characters and line drawings but also halftone images such as photos or colored images in output of information items inputted.

For the output of these images, various recording methods and recorders have been developed. Among them, the ink-jet (IJ) scheme enabling an inexpensive and high quality color image recording has begun to be accepted widely by the market. With many popular types of recorders including this IJ recorder, halftone records as mentioned above are expressed in terms of areal gradation.

The areal gradation means a method for executing a halftone reproduction by controlling the recording area onto the recording medium and if an example of IJ recorder is taken for the explanation, this method can be roughly divided into the dot-diameter modulation scheme and the pseudo gradation scheme. The dot-diameter modulation scheme is a method for controlling the size of a dot on a sheet of paper according to a value of gradation to control the recording area for unit area by controlling the ink-jet amount of a dot to be recorded, whereas devised as the pseudo gradation scheme are well-known gradation reproducing methods such as dither matrix method or ED (Error Diffusion) method.

However, the existing gradation-reproducing methods mentioned above have the following disadvantages.

1. Actually, in the dot-diameter modulation scheme, an ejection amount per dot varies about twice at the utmost in a modulation range and this level of ejection amount modulation is insufficient for a halftone reproducibility. In comparison of the recorded dot diameter in an ejection amount of 80 ng/dot with that in an ejection amount of 8 ng/dot on paper, dot diameter on the paper surface differs only by about twice though the ejection amount differs by ten times. Even if somewhat of variations appears without doubt according to the composition of ink, a modulation width of about twice by the ejection amount cannot be sufficient as an areal gradation means by the control of the recorded dot diameter on paper at all.

2. The pseudo gradation method, e.g., dither matrix method, is a method for controlling the number of dots recorded in a decided matrix size. By increasing the matrix size, the gradation reproducibility can be also improved, but the actual resolution lowers and the sharpness of characters or line drawings worsens. Furthermore, especially in the image portion of a low gradation (highlight part), the grainy feeling of dots takes place as foreign feeling. Using the ED method mentioned above a lowering of resolution can be moderated in some extent, but the grainy feeling in the highlight part is not improved because it is originated from a dot density.

There is a recording method using a dilute pale ink in such a manner that the grainy feeling is not noticed, but the use of an ink diluted unduly cannot satisfy the highest density in the dark part though the grainy feeling in the highlight part can be moderated, so that a higher quality is unexpectable as a whole image. Alternatively, there is a so-called a high and low concentration ink recording method in which inks of the same color at a plurality of concentrations are used as a recording ink. This is a method in which both the grainy feeling in the highlight part and the highest density in the dark part are satisfied by using a sufficiently diluted ink and a sufficiently concentrated ink, but in this case, grainy feeling never fails to appear at a switching portion from a pale ink recording to a deep ink recording in the reproduction process of gradation. To be specific, when a dot of sufficiently concentrated ink is printed into a highlight image portion recorded by a sufficiently diluted pale ink, grainy feeling never fails to be noticeable due to the difference in contrast between pale ink images and deep ink images, thereby losing an effect of executing a concentration varying recording. Needless to say, increasing the diluted grades of ink, by use of middle ink diluted to an intermediate concentration between the pale and the deep ink, further use of middle diluted and middle deep ink at a further intermediate concentrations, and so on, can solve such a problem, but has difficulty in practical use because the accompanying increase in recording heads and recording ink species results in a great cost rise.

SUMMARY OF THE INVENTION

Made to solve the existing problems mentioned above, the present invention has an object of providing a half-tone recording method enabling a high-quality halftone recording in a less degree of grainy feeling without reduction of a real resolution and an apparatus for making a halftone recording thereby, as well as an ink tank and a head cartridge fit for the halftone recording and an ink-jet recorder using the same.

According to the present invention there is provided an apparatus for making a halftone recording by employing three or more types of color materials, comprising three or more types of color materials each of which has at least one grade of concentration, wherein each type of the color materials having the lowest concentration provides, when recording on a recording medium having a first lightness, a recorded region having its own lightness, and wherein a difference between the first lightness and the lightness of the recorded region is not more than 35, the lightness being measured according to the definition of CIE 1976 psychological measurement lightness using a standard illuminating light D65 as a light source.

According to the present invention there is also provided a process for making a halftone recording, comprising providing three or more color materials each of which having at least one concentration grade, and adding the color materials on a recording medium having a first lightness, wherein each type of the color materials having the lowest concentration provides, when recording on the recording medium, a recorded region having its own lightness, and wherein a difference between the first lightness and the lightness of the recorded region is not more than 35, the lightness being measured according to the definition of CIE 1976 psychological measurement lightness using a standard illuminating light D65 as a light source.

According to the present invention there is further provided an ink tank used in an apparatus for making a halftone recording, the ink tank holding three or more types of color materials each of which having at least one grade of concentration, wherein each type of color materials having the lowest concentration provides, when recording on the recording medium, a recorded region having its own lightness, and wherein a difference between the first lightness and the lightness of the recorded region is not more than 35, the lightness being measured according to the definition of CIE 1976 psychological measurement lightness using a standard illuminating light D65 as a light source.

According to the present invention there is still provided a head cartridge that uses an ink tank according to claim 19, equipped with a recording head for ejecting the color materials fed from said ink tank.

According to the present invention there is still also provided a head cartridge that uses an ink tank according to claim 19, equipped with a recording head for ejecting the color materials fed from said ink tank and so arranged that the ID information indicating the types of color materials kept therein can be outputted.

According to the present invention there is still futher provided an ink-jet apparatus that uses an ink tank according to claim 28 for recording, comprising: a recording head for ejecting ink kept in said ink tank; and a printing amount control section for identifying the lass of a color material kept therein with an ID information outputted by said ink tank and determining driving conditions of said recording head corresponding to the identified type of the color material.

According to the present invention there is also still provided an ink-jet apparatus that uses a head cartridge according to claim 30 for recording, comprising: a loading section for exchangeably loading said head cartridge; and a printing amount control section for identifying a class of a color material kept in the loaded head cartridge with an ID information outputted by said head cartridge loaded in said loading section and deciding the driving conditions of said recording head corresponding to the identified class of the color material.

According to the present invention there is also still further provided an ink-jet apparatus comprising: a loading section for loading a first ink-jet head for ejecting a first ink superior in coloristic performance and a second ink-jet head for ejecting a second ink inferior in coloristic performance in a mutually exchangeable manner; and drive means for providing drive conditions to the ink-jet head loaded on said loading section.

According to the present invention there is still also further provided an apparatus for making a halftone recording by employing three of more types of coloring materials, wherein each of the three of more types of color materials has at least two grades of concentration, the color materials of adjacent concentration grades in every type of color materials, provide respective recorded region having its own lightness, a lightness difference between the recorded regions being not more than 35, the lightness being measured according to the definition of CIE 1976 psychological measurement lightness using a standard illuminating light D65 as a light source.

According to the present invention there is provided an apparatus for making a halftone recording by employing three types of color materials of yellow, magenta and cyan, each type of color material having at least one concentration grade, wherein each type of color materials of magenta and cyan contains color materials which provide a recorded region having its own lightness when each type of color materials of magenta and cyan having the lowest concentration is recorded on a recording medium having a first lightness, a difference between the first lightness and the lightness of the recorded region being not more than 35, the lightness being measured according to the definition of CIE 1976 psychological measurement lightness using a standard illuminating light D65 as a light source.

According to the present invention there is provided an apparatus for making a halftone recording by employing three types of color materials of yellow, magenta and cyan each of which having at least two concentration grades, wherein the color materials having adjacent concentration grades provide recorded regions having respective lightness, a lightness difference between the recorded regions is not more than 35, the lightness being measured according to the definition of CIE 1976 psychological measurement lightness using a standard illuminating light D65 as a light source.

According to the present invention there is provided an apparatus for making a halftone recording by employing at least two types of color materials of magenta and cyan each of which having at least one concentration grade, wherein each type of the color materials having the lowest concentration provides, when recording on the recording medium having a first lightness, a recorded region having its own lightness, and wherein a difference between the first lightness and the lightness of the recorded region is not more than 35, the lightness being measured according to the definition of CIE 1976 psychological measurement lightness using a standard illuminating light D65 as a light source.

According to the present invention there is provided an apparatus for making a halftone recording by employing at least two types of color materials of magenta and cyan each of which having at least two concentration grades, wherein the color materials having adjacent concentration grades provide recorded regions having respective lightness, a lightness difference between the recorded regions is not more than 35, the lightness being measured according to the definition of CIE 1976 psychological measurement lightness using a standard illuminating light D65 as a light source.

According to the present invention there is provided a process for making a halftone recording by employing three types of color materials each of which having at least two concentration grades, wherein the color materials having adjacent concentration grades provide recorded regions having respective lightness, a lightness difference between the recorded regions is not more than 35, the lightness being measured according to the definition of CIE 1976 psychological measurement lightness using a standard illuminating light D65 as a light source.

According to the present invention there is provided a process for making a halftone recording by employing at least three types of color materials of yellow, magenta and cyan, each of which having at least one concentration grade, wherein each type of color materials of magenta and cyan contains color materials which provide a recorded region having its own lightness when each type of color materials of magenta and cyan having the lowest concentration is recorded on a recording medium having a first lightness, a difference between the first lightness and the lightness of the recorded region being not more than 35, the lightness being measured according to the definition of CIE 1976 psychological measurement lightness using a standard illuminating light D65 as a light source.

According to the present invention there is provided a process for making a halftone recording by employing at least three types of color materials of yellow, magenta and cyan, each of which having at least two concentration grades, wherein the color materials having adjacent concentration grades provide recorded regions having respective lightness, a lightness difference between the recorded regions is not more than 35, the lightness being measured according to the definition of CIE 1976 psychological measurement lightness using a standard illuminating light D65 as a light source.

According to the present invention there is provided a process for making a halftone recording by employing at least two types of color materials of magenta and cyan, each of which having at least one concentration grade, wherein each type of color materials of magenta and cyan contains color material which provide a recorded region having its own lightness when each type of color materials of magenta and cyan having the lowest concentration is recorded on a recording medium having a first lightness, a difference between the first lightness and the lightness of the recorded region being not more than 35, the lightness being measured according to the definition of CIE 1976 psychological measurement lightness using a standard illuminating light D65 as a light source.

According to the present invention there is provided a process for making a halftone recording by employing at least two types of color material of magenta and cyan, each of which having at least two concentration grades, wherein the color material having adjacent concentration grades provide recorded regions having respective lightness, a lightness difference between the recorded regions is not more than 35, the lightness of the recorded region is not more than 35, the lightness being measured according to the definition of CIE 1976 psychological measurement lightness using a standard illuminating light D65 as a light source.

According to the present invention there is also provided a process for making an image, comprising the steps of: providing at least three types of color materials of yellow, magenta and cyan, each of which having at least two concentration grades, and forming an image on a recording medium by employing the color materials, the image consisting of primary colors made by each of the color materials, and secondary colors made by mixture of the different types of color materials, wherein the color materials having adjacent concentration grades provide recorded regions having respective lightness, a lightness difference between the recorded regions is not more than 35, the lightness being measured according to the definition of CIE 1976 psychological measurement lightness using a standard illuminating light D65 as a light source, and wherein the forming steps comprises a step of subjecting color separation of each of pixels constituting the image into primary color components, and a step of modifying maximum printing amounts of the color materials to be added onto the recording medium according to the concentration grades of the color materials as for the primary color components resulting from the color-separation.

BRIEF DESCRIPTION OF THE DRAWINGS

FIGS. 7A and 7B are illustrations of another method for detecting the classification of ink tanks at an ink cartridge 1, employed in an ink-jet apparatus according to another embodiment of the present invention;

FIG. 8 is a flowchart showing the processing of a color processing module of a printer driver according to another embodiment of the present invention;

FIG. 10 is a chart explaining the relation among a coloring matter concentration of ink, data, recording media and maximum printing amount in another embodiment of the present invention;

FIGS. 11A and 11B show the positions of recorded dots based on 360 dpi and multivalued data, respectively;

FIGS. 12A, 12B and 12C are each a drawing showing dispositions of print data and dots in another embodiment of the present invention, where FIGS. 12A to 12C show cases of binary data, tetravalued data and pentavalued data, respectively;

DESCRIPTION OF THE PREFERRED EMBODIMENTS

Figure 1:
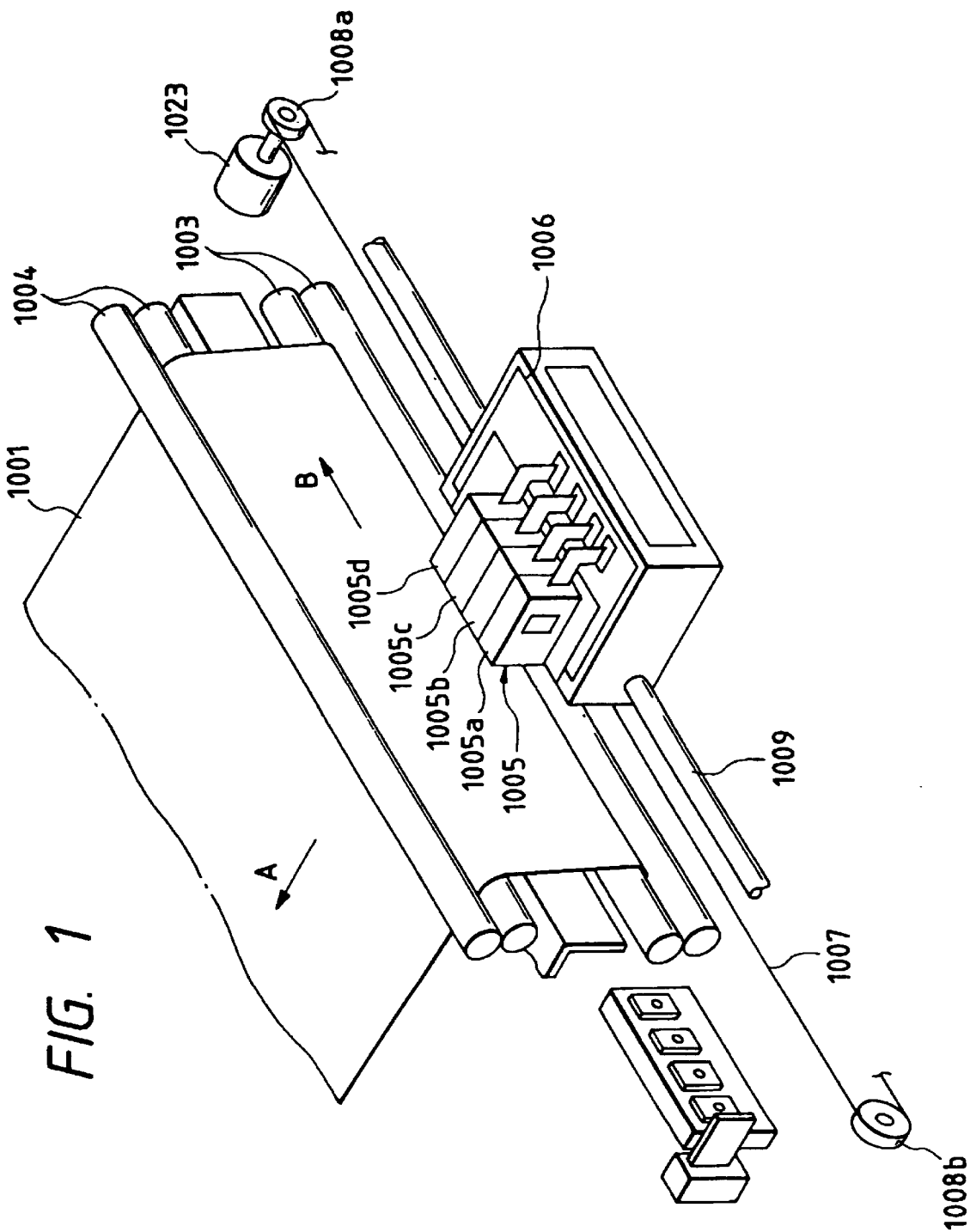
FIG. 1 is an illustration of one embodiment of the present invention.

The apparatus for making a halftone recording according to the present invention comprises respective recording means for recording individual colored materials of substantially same color different in lightness to execute a high-quality gradation recording. The above plurality of recording means may be of separate piece scheme for executing a recording by using a plurality of recording heads or of one piece scheme for executing a recording by using a single recording head.

For a high image quality of gradation recording, it is important to implement a wide gradation reproduction range from the low halftone image part (highlight part) to the high halftone image part (dark part) and a heterogeneity-free gradation junction between them. A wide gradation reproduction range alternatively means that a maximum reproducible image density is high and can be implemented by raising a solid print density above a definite value. Besides, although a heterogeneity-free gradation junction is not easily defined, the inventors have found that it can be defined as one index by the contrast difference from the surrounding images. For example, in printing a recorded dot on a recording medium, a higher contrast between a recording medium and printed dots than a definite value will make a spotty feeling or rough feeling (referred to as grainy feeling) conspicuous. As one index for contrast, lightness difference can be mentioned. If this lightness difference exceeds 25, a grainy feeling begins to become appreciable and is significantly stirred if exceeding 35. Since a lightness of a general copying paper is around 90, it is desirable for making the grainy feeling inconspicuous even in direct recording on a recording medium of this lightness that the recording lightness of ink exceeds 65. Thus, let such ink (color material) be employed that the recording lightness with the most concentrated ink (thick ink) becomes 65.

Incidentally, the above-mentioned recording lightness means a value generally designated with L* in the definition of psychological measurement lightness recommended in 1976 by the CIE (Commission Internationale de Enluminure). Hereinafter, the lightness, hue and saturation is to follow the definitions in CIE 1976 unless otherwise specified.

And, the measurement method of recording lightness is to measure a lightness of a recorded dot which is recorded on a recording medium by the above recording means, or that of a solid print region of a 100% solid printing of a color material, and the light source at that time is a standard illuminating light D65 in the CIE definitions mentioned above.

As mentioned above, it is preferable for the attainment of a wide reproducing range to set the maximum image density above a definite value. If a dedicated recording medium proper to the apparatus for making a halftone recording is used, this maximum density record is preferably at least 1.4 in terms of optical reflection density (OD), measured by using a complementary color filter to the measured color. Even in a record on general copying paper, it is desirable for the purpose of implementing a high image quality that a value of not lower than 1.0 is achieved in terms of the O.D. mentioned above. In a system of full-color recording by using Y (yellow), M (magenta) and C (cyan) ink, for example, related to the embodiments mentioned later, the Y ink has a lightness of not lower than 65 and can implement a density of 1.4, and accordingly one type of ink having a lightness of 85 is employed as Y ink. Since M and C ink adjusted to a lightness of 65 cannot achieve an OD value of 1.4, one type (pale ink) having a lightness of 65 in recording lightness and moreover another type of each of M and C ink (deep ink) capable of achieving an OD value of 1.4 are established. Here, the halftone recording is performed by the pale ink for the highlight (low gradation) part and by mixing it with the deep ink as the recording is moved to the dark (high gradation) part. In the case of mixing it with the deep ink, it is advisable for making the grainy feeling of dots unremarkable due to the deep ink to determine the lightness difference between the pale ink record portion and the deep ink record preferably within 25, even at the greatest within 35. As a result of experiments, an OD value of not less than 1.4 at a solid print portion printed with the deep ink can be attained, by making a recording lightness of M and C deep inks about 50. Since this recording lightness of 50 is sufficiently small, i.e., by 15, in difference of a recording lightness with the pale ink, the grainy feeling can be made hardly noticeable, even when the deep ink recording may co-exist into the pale one, without further using a middle concentration of ink between the pale ink and the deep ink. Thus, with the aspect of this embodiment, use of one type for the Y ink and two types for each of the M and C inks, adjusted to the above-mentioned concentration, enables a high image quality gradation apparatus for making a halftone recording having a heterogeneity-free junction of gradation and a wide gradation reproducing range to be implemented in the provision of a minimum types (recording lightness) of inks (color materials) for each color.

The concept of coloristic performance is indicated by a strength of coloring ability of ink itself, or the degree of coloristic performance depicted on a recording medium.

In case of a chromatic color, it indicates a strength of coloring ability, and in case of an achromatic color, it indicates a degree of lightness. In such meaning, this may be a dye concentration of ink when using the same dye or pigment.

Alternately, for comparison in the printed state on a recording medium, it may be an optical reflection density or the maximum saturation in one and the same hue.

So-called photo-coloring is positioned at an excellent coloristic performance.

EXAMPLE 1

Next, by referring to the drawings, one embodiment will be described in detail. Incidentally, this embodiment refers to an apparatus for making a halftone recording having one type of color material for each hue.

FIG. 1 is a perspective view for explaining an apparatus for making a halftone recording of ink-jet scheme.

First, the general configuration of an apparatus for making a halftone recording will be described. In FIG. 1, numeral 1001 denotes a recording sheet comprising paper or plastic sheet. The apparatus for making a halftone recording is so arranged that a plurality of sheets 1001 stacked on a cassette or the like are fed one by one by means of a paper feed roller (not shown) and conveyed in the direction of the arrowhead A by means of a first pair of convey rollers 1003 and a second pair of convey rollers 1004 disposed a definite gap apart each driven with individual stepping motors (not shown).

The recording head 1005 of ink-jet type for executing the recording onto the above recording medium sheet 1001 comprises a recording head 1005a for the recording in K (black) ink, a recording head 1005b for the recording in C (cyan) ink, a recording head 1005c for the recording in M (magenta) ink and recording head 1005d for the recording in Y (yellow) ink. Inks have only one grade of concentration for each color and are fed from the respective ink cartridges (not shown) and discharged from nozzles in response to image signals. These recording heads 1005 and ink cartridges are loaded on a carriage 1006, to which a cartridge motor 1023 is connected via a belt 1007 and pulleys 1008a and 1008b. Thus, the carriage 1006 is so arranged as to scan back and forth along a guide shaft 1009 by driving the carriage motor 1023.

According to the above arrangement, the recording head 1005 discharge ink to a record sheet 1001 in response to image signals while travelling in the direction of the arrowhead B to record an ink image, and the recording head 1005 returns to the home position for resolving a nozzle clogging by using an ink restoring device (not shown), as needed and moreover the pairs of convey rollers 1003 and 1004 are driven to convey the recording sheet 1001 by one line in the direction of the arrowhead A. By repeating this procedure, a predetermined recording is performed on the recording sheet 1001.

Figure 2:
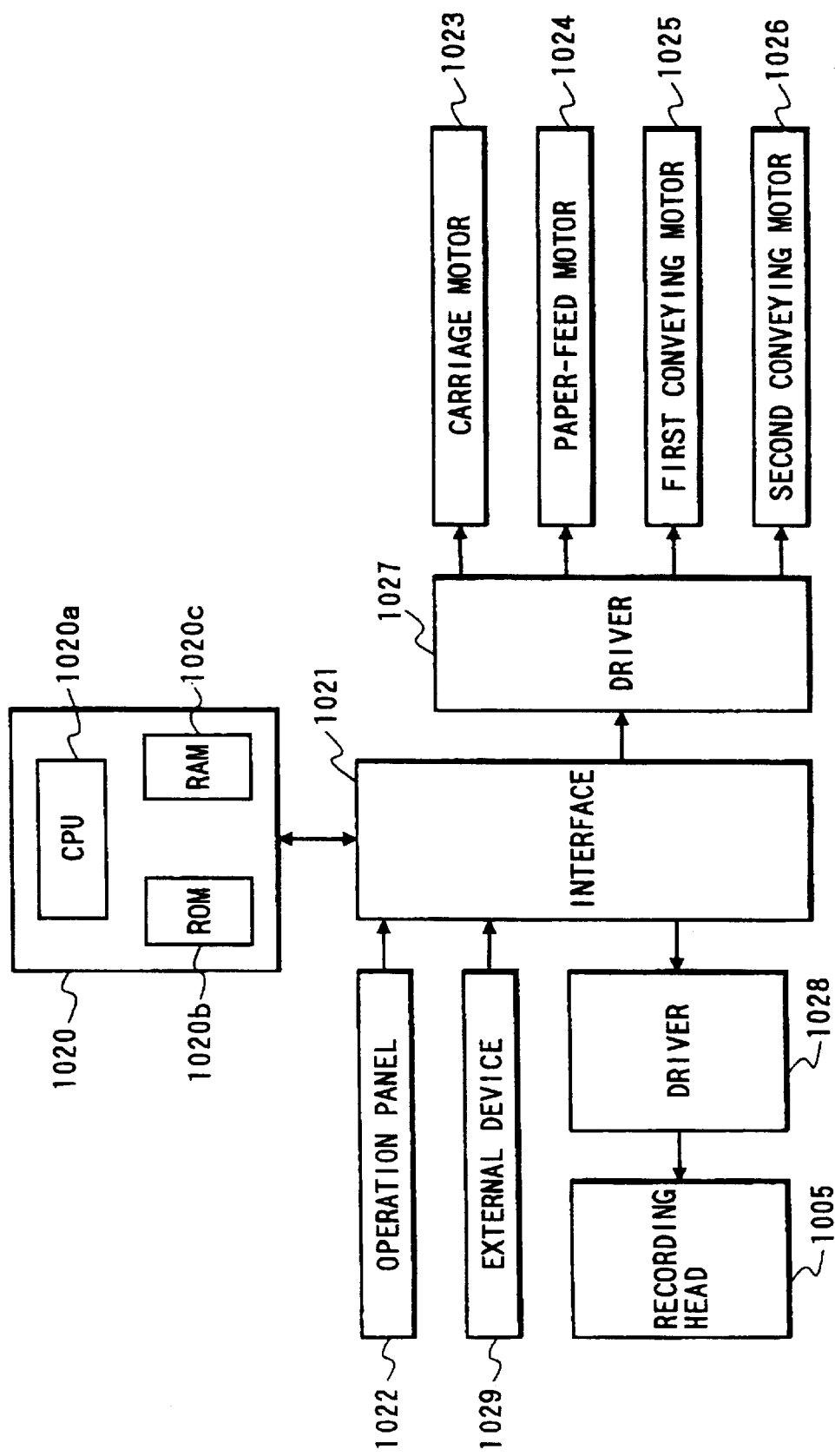
FIG. 2 is a block diagram explaining the logic of a recorder.

Next, the control system for driving individual members of the above apparatus for making a halftone recording will be described. As shown in FIG. 2, this control system comprises a control section 1020 equipped with a CPU 1020a such as a microprocessor, a ROM 1020b for storing a control program or various data of this CPU 1020a and a RAM 1020c used as the work area of the CPU 1020a and performing a temporary storage of various data such as recording image data, an interface 1021, an operating panel 1022, a driver 1027 for driving individual motors (a carriage motor 1023 for driving a carriage, a paper feed motor 1024 for driving a paper feed roller, a first conveying motor 1025 for driving a first pair of convey rollers, a second conveying motor 1026 for driving a second pair of convey rollers) and a driver 1028 for driving a recording head 1005.

The above control section 1020 performs the I/O (input/output of information) of various information items, such as i.e., character pitch and character type, from the operating panel, image signals to an external device 1029 or the like via the interface 1021. Besides, the control section 1020 outputs an ON signal and an OFF signal for driving individual motors 1023 to 1026 and image signals via the interface 1021 and drives individual members in response to these image signals.

With the above apparatus for making a halftone recording, recording is made at a resolution of, e.g., 360 dpi (dot/inch). The resolution of the recording head is also 360 dpi and each head has 64 recording nozzles in one line. A droplet of a recording liquid discharged from each nozzle is about 40 ng in common to all heads and the diameter of a recorded dot in cases of recorded on general copying paper is about 90 $\mu$m. Thus, by printing one dot on each of length and widthwise 360 dpi lattice points, the print area of a recording medium is totally covered with recording ink (printing of this printing ratio will be abbreviated as "100% solid printing").

Recording media in the target of this apparatus for making a halftone recording include, e.g., the general copying paper mentioned above and exclusive paper for an ink-jet system having a coat layer for retaining an ink provided on the surface. Table 1 shows compositions of inks which makes an OD value not lower than 1.0 when a 100% solid printing is performed on the general copying paper mentioned above and not lower than 1.4 for a 100% solid printing is performed on exclusive paper for an ink-jet system. The dye concentration of Y ink is 3.0% by weight and those of other K, C and M inks are 3.5% by weight, respectively. As shown in Table 1, the solvent is composed of glycerine, acetylenol, urea and distilled water.

TABLE 1

|  | K | C | M | Y |
| --- | --- | --- | --- | --- |
| Dye | 3.5% | 3.5% | 3.5% | 3.0% |
| Glycerine | 15.0% | 15.0% | 15.0% | 15.0% |
| Acetylenol | 1.0% | 1.0% | 1.0% | 1.0% |
| Urea | 7.5% | 7.5% | 7.5% | 7.5% |
| Distilled water | 73.0% | 73.0% | 73.0% | 73.5% |

(%: by weight)

Table 2 shows a relation between an OD value and a recording lightness when recording is performed with inks mentioned above on the exclusive paper for an ink-jet system.

TABLE 2

|  | Original | 3-times | 4-times | 5-times |
| --- | --- | --- | --- | --- |
| C (cyan) ink | | | | |
| 100% | 1.50 | 0.90 | 0.70 | — |
|  | 52.1 | 69.1 | 73.0 |  |
| 200% | 1.75 | 1.42 | 1.15 | — |
| 300% | — | 1.62 | 1.50 | 1.30 |
| M (magenta) ink | | | | |
| 100% | 1.42 | 0.75 | — | — |
|  | 46.2 | 65.0 |  |  |
| 200% | 1.60 | 1.35 | — | — |
| 300% | — | 1.42 | — | — |
| Y (yellow) ink | | | | |
| 100% | 1.41 | — | — | — |
|  | 88.8 |  |  |  |
| 200% | — | — | — | — |
| 300% | — | — | — | — |

In Table 2, values of the column designated with "Original" are experimental results in recording with the ink mentioned above, and those of the row designated with "100%" are ones obtained in a 100% solid painting. Incidentally, "200%" represents the results in printing of one dot for each of the lattice points, 360 dpi in length and 720 dpi in width and the printed amount of recorded dots per unit area is double that obtained in a 100% solid printing. As evident from Table 1, the OD value for individual colors at a 100% solid printing is 1.50 for C ink, 1.42 for M ink and 1.41 for Y ink as shown leftward above a slant broken line in sections, all of which exceed 1.4. Since the maximum image density is sufficiently high, the gradation reproducing range, one important factor for a high image quality gradation recording, can be chosen to be sufficiently wide. However, as shown rightward below a slant broken line, the recorded lightness is 88.8 and sufficiently high for Y and by contraries, is 52.1 for C and 46.2 for M, both of which are below 60. The lightness of the above-mentioned recording medium exclusively used for an ink-jet system is 94.2, while the difference of the recording medium in recording lightness from C and M ink is 42.1 and 48.0, respectively, which differences are considerably large. Since a recording lightness exceeding 35 will lead to a marked development of grainy feeling of dots as mentioned above, no heterogeneity-free nor smooth junction can be expected in the reproduction of gradation, especially for the highlight portion. In Table 2, the columns designated with 3-times, 4-times and 5-times are the results in diluted inks. Here, the 3-times represents the use of ink diluted to one third of a dye concentration for the original, while the 4-time and 5-time represent the use of ink diluted to one fourth and one fifth, respectively. As evident from the experimental results cited in Table 2, the recording lightness (rightward below a slant broken line) can be raised with decreasing a dye concentration and the grainy feeling can be also reduced. However, the image density in a 100% solid recording decreases corresponding to an increase in dilution factor, thereby resulting in the trade-off as comprehensive image quality of gradation reproduction.

In this embodiment, however, the solution is derived by quantitatively judging a balance between the grainy feeling in the highlight part and the maximum image density, affecting the quality of gradation reproducibility. That is, each dye concentration of Y, M and C inks can be determined in-such a manner as to make the recording lightness of individual colors lying not less than 60. The reason why the recording lightness is made to be not less than 60 is to keep the lightness difference within 35 (L*≦35). Recording media to be subjected to one apparatus for making a halftone recording are generally not of one type. Besides, since generally copying paper available for a user is of various types, the lightness of various media related to these ranges from about 85 to about 90 and that of the exclusive paper for an ink-jet system ranges from about 90 to about 95. Thus, even for the most serious exclusive paper for an ink-jet system having a medium lightness of 95, the lightness difference of from 25 to 35 can be attained for most of copying paper and exclusive paper for an ink-jet system, if the recording lightness recorded by a recording ink is matched to not lower than 60. As mentioned above, a lightness difference of 25 is a preferable range for the elimination of a grainy feeling and a lightness of 35 is an allowable range for a grainy feeling, and therefore setting the recording lightness to not lower than 60 enables the most appropriate dilution concentration to be determined for the majority of recording media.

In Example 1, by determining the dilution factor to 3-times both for C and for M, the C and M recording lightness can be made to be not lower than 60. Thus, the lightness difference from the majority of recording media can be kept within 35, and even-for gradation reproduction in the highlight part, a smooth heterogeneity-free junction can be attained. Table 3 shows the dye concentrations satisfying the conditions mentioned above for individual colors. The dye concentrations of C and M inks are lowered from 3.5% by weight to a one third value, 1.2% by weight, and the content of distilled water in the solvent is changed from 73% by weight to 75.3% by weight.

TABLE 3

|  | K | C | M | Y |
|---|---|---|---|---|
| Dye | 3.5% | 1.2% | 1.2% | 3.0% |
| Glycerine | 15.0% | 15.0% | 15.0% | 15.0% |
| Acetylenol | 1.0% | 1.0% | 1.0% | 1.0% |
| Urea | 7.5% | 7.5% | 7.5% | 7.5% |
| Distilled water | 73.0% | 75.3% | 75.3% | 73.5% |

(%: by weight)

As shown in Table 2, an OD value for a 100% solid printing with the diluted C and M inks mentioned above are respectively 0.9 and 0.75 and cannot be said to be sufficient at all. Thus, in Example 1, the overall raising of the maximum concentration is accomplished by increasing the printing amount of ink to be printed with. Considering that the dot diameter of a recorded dot is about 90 $\mu$m for general copying paper and the recording resolution is 360 dpi as mentioned above, the 100% solid printing is sufficient as a solid printing. That is, by a 100% solid printing, the recording part on a recording medium can be totally covered with a recording ink. Usually, when gradation is reproduced in terms of areal gradation, the maximum concentration is determined at the time when a recording medium in the recording section is totally covered with record dots, but a recording medium cannot always accept only the 100% solid printing. According to experiments, many types of copying paper could accept ink, e.g., to a 300% solid printing. Thus, if the maximum density is intended with a 300% solid printing, the OD value can be attained to 1.62 for C ink and to 1.42 for M ink with the above 3-time diluted ink as shown in Table 2. Since the Y ink are not diluted as mentioned above, the recording lightness which comes into question as grainy feeling especially for the highlight part and the maximum image recording density can be attained respectively to and below 35 and to and above 1.41 throughout C, M and Y colors.

Incidentally, for the K (black) ink of an achromatic color, the recording lightness is 28.5 and much lower than 60 in the dye concentration of Table 3, but the K ink is not always required to have a recording lightness of not lower than 60 by the reasons that a pale gray can be synthesized by using C, M and Y inks, and that the K color of an achromatic color differs in character from a color hue of a chromatic color and is required for the output of a black letter or black ruled lines at a high contrast rather than from the viewpoint of grainy feeling. Thus, in this embodiment, the K ink remains undiluted in a high concentration, but needless to say, the K ink having a recording lightness of not lower than 60 may be used or the scheme of using the K ink diluted below 28.5 as is the existing state inferior to 60 in recording lightness is allowable in consideration that an achromatic color image of low gradation is recorded by the synthesis of C, M and Y inks.

Meanwhile, with respect to secondary colors such as R (red), G (green) and B (blue), neither density nor lightness are mentioned, but with an arrangement that the density and lightness of the primary colors (C, M, Y) are reproducible in a high image quality, those skilled in the art can easily understand that reproduction of a high image quality gradation is possible also for secondary or higher-order colors created by the combination of primary colors, such as, e.g., by the creation of a secondary color as a plane without overlap of dots of two colors at the unit of pixels in a secondary color region of the low gradation part, and accordingly a detailed description is omitted here.

Also concerning methods for 300% solid printing, those skilled in the art would be still able to easily understand that there are a plurality of implementing means, such as, e.g., a method of tetravalued recording (printing method of not printing at the unit of pixel, such as one-dot printing, two-dot printing and three-dot printing) by printing on 600 dpi pixels through a plurality of buses or a method of a triple printing amount of ink per area relative to the 360 dpi pixels, by setting the transverse resolution to 1080 dpi.

As mentioned above, by setting the recording lightness of all recording color materials for recording a chromatic color image to or above 60 (L*≧60), an apparatus for making a halftone recording for implementing a high image quality gradation reproduction having a smooth heterogeneity-free gradation junction in the whole halftone reproduction region from the low gradation part to the high gradation part and having a wide gradation reproducing range can be easily provided with a plurality of ink types (color materials) having the same hue and different lightness.

EXAMPLE 2

Next, another embodiment enabling a still higher image quality of gradation reproduction will be described. Described in Example 1 is an example of an ink composition in which a high image quality of gradation reproduction can be accomplished with one type of ink in substantially same hue for each color. As mentioned above, this was an arrangement that a high image quality of gradation reproduction can be accomplished but a great amount of ink per area is printed within the allowable accepting limits of a target recording medium. With larger printing amount of ink, the amount of consumed ink increases and the running cost augments. Besides, trouble in operation, such as a rise in the frequency of replacement, increases.

Furthermore, since the number of printed dots increases, there are also cases where not-to-be-neglected difference such as a shorter life of printing heads appears in applications to a great deal of printing.

In Example 2, an apparatus for making a halftone recording in which the above problems are suppressed by reducing the number of printed dots per area is implemented. According to this embodiment, inks having a plurality of recording lightness different in lightness at substantially same hue are established under conditions that a high image quality of gradation reproduction can be actualized and in such a manner that the maximum density can be attained in the 100% solid printing.

As mentioned above, the conditions that a high image quality of gradation reproduction can be actualized means that a heterogeneity-free junction of gradation can be attained in the whole halftone reproducing region from the low gradation part to the high gradation part and a wide gradation reproducing range is provided. Specifically, in this embodiment, the lightness difference between the recording lightness of printed dot in a gradation recording of substantially same hue and the surrounding lightness lies within 35 (including a case where the lightness difference between the recording lightness with a color material of the maximum lightness and the surrounding lightness lies within 35) and the maximum density is an OD value of not lower than 1.4 for exclusive paper for an ink-jet system and an OD value of not lower than 1.0 for general copying paper.

Ink is selected first from the limits that an OD value of not lower than 1.4 in the 100% solid printing, where the recording medium is exclusive paper for an ink-jet system. In this embodiment, as described by using Tables 1 and 2, a dye concentration satisfying these conditions is set to 3.5% by weight for C ink, 3.5% by weight for M ink and 3.0% by weight for Y ink (3.5% by weight for K ink). Thereby, the OD value of primary colors can be attained to 1.5 for C images, 1.42 for M images and 1.41 for Y images in the 100% solid printing (ink types of these concentrations are referred to as "deep ink" for the sake of convenience).

Next, a high image quality of gradation reproduction that cannot be improved with the deep ink mentioned above, i.e., a method for a smooth heterogeneity-free junction of gradation, will be considered. As described in Table 2, the recording lightness with deep inks are 52.1, 46.2 and 88.8 for C, M and Y inks, respectively. As mentioned above, in order to make a grainy feeling unnoticed even on printing of recorded dots in these recording lightness, the lightness difference from the background (i.e., images already recorded) must be kept within 35 (preferably within 25). Thus, the lightness of less concentrated ink types (referred to as "pale ink" for the sake of convenience) than the deep ink can be selected in the limits of not higher than 87.1 and 81.2 for C and M inks, respectively (since the lightness difference is desirably within 25, lightness of not higher than 77.1 and 71.2 for C and M inks are more preferable). And aside from the lightness difference from the recording lightness with deep ink, the difference from the lightness of a recording medium must be also considered. The recording medium assumed in this embodiment has a maximum lightness of 95 as with Example 1. Thus, by setting the recording lightness of pale ink in between lightness of deep ink and of a recording medium, the lightness difference from both can be set within the allowable limits. Thus, the pale ink of C and M colors are set to inks at columns of 4-times and 3-time in Table 2. That is, the pale recording lightness of C ink and M ink are 73.0 and 65.0, respectively. Since the deep ink of Y color satisfies both density and lightness, the pale ink need not to be set.

In the setting of the deep and pale inks, with respect to C images, the lightness difference becomes 22 (95 minus 73) between a medium and pale recorded images and 20.9 (73.0 minus 52.1) between pale recorded images and deep recorded images, while the maximum recording density (optical reflection density; OD) becomes 1.50. And with respect to M images, the lightness difference becomes 30 between the medium and-pale recorded images and 18.8 between pale recorded images and deep recorded images, while the maximum recording density (optical reflection density; OD) becomes 1.42. And with respect to Y images, the lightness difference becomes 6.2 between the medium and Y images, while the maximum recording density (optical reflection density; OD) becomes 1.41. With respect to all recorded images, the above-mentioned conditions for a high image quality of gradation reproduction can be satisfied.

The compositions of pale C and M inks are shown in Table 4.

TABLE 4

|  | K | C | M | Y |
| --- | --- | --- | --- | --- |
| Dye | 3.5% | 0.9% | 1.2% | 3.0% |
| Glycerine | 15.0% | 15.0% | 15.0% | 15.0% |
| Acetylenol | 1.0% | 1.0% | 1.0% | 1.0% |
| Urea | 7.5% | 7.5% | 7.5% | 7.5% |
| Distilled water | 73.0% | 75.6% | 75.3% | 73.5% |

(%: by weight)

When considering the gradation reproduction for M color, it is preferable in many cases that the lightness difference between the medium and the M pale image is larger by not smaller than 10 than the lightness difference between the M pale and the M deep images and the M pale ink is slightly higher in lightness, so that the dye concentration of the M pale ink may be adjusted but even the above setting raises no problem because it lies within the above conditions for a high image quality of gradation reproduction.

In Example 2, on the premises that the maximum density of recorded images is determined at or above 1.4, that the recording media are determined to be general copying paper and exclusive paper for an ink-jet system and that the compositions of inks are set as determined in Table 1, the types of ink happened to become two types for C and M inks and one type for Y ink, but if these premises are altered, the number of necessary types are determined differently in various combinations of ink types. Whatever the premises may be, the effect of the present invention, a high image quality of gradation reproduction, is implemented by adjusting the compositions of ink under the conditions that the recording lightness difference between the media and between the respective ink is 35 or smaller (desirably 25 or smaller), and needless to say, the present invention is not limited to the preconditions of Example 2 or to one example of optimal combinations under the relevant conditions. However, the lightness has a maximum value of 100 according to the definition and if the apparatus for making a halftone recording is a printing system on a recording medium, a maximum lightness of actually existing recording media can be understood to be about 95. Accordingly, by the provision of color materials (pale color materials) capable of recording having a lightness of not smaller than 60 as the maximum, a grainy feeling between a recording medium and pale color material can be suppressed in most cases.

And, in Example 2, combinations of inks are exemplified in the combination comprising C, M, Y and K, but alternatively, e.g., to even the combination of R, G and B or to other combinations or further to a monocolor apparatus for making a halftone recording of one hue type, the present invention is applicable in view of a high image quality of gradation reproduction.

The above-mentioned term "color material (ink) having the same hue, but different lightness" means a color material having high-lightness which is mainly employed for recording lower gradation part (highlight part), and a color material having low-lightness which is mainly employed for recording high gradation part (dark part), both the color materials being able to provide a gradation recording provided with same hue. Thus, the ink different in lightness, employed at the gradation recording having the same hue, is not always limited to two types. When three or more color materials different in lightness for the gradation recording having the same hue are provided, a configuration and an operating effect are similar to those of Example 1 and therefore the description is omitted.

EXAMPLE 3

Next, still another embodiment will be described. In the embodiment described hereinafter, "color materials (inks) having the same hue and-different lightness" are inks of different dye concentrations and charged in different ink cartridges to execute the recording (print). Hereinafter, features of this embodiment will be described before the description of this embodiment.

(1) With the modification of a dye concentration in ink by the cartridge replacement, at least either one of the printing amount or the maximum printing amount is modified by the identification or setting input with ID in conformity to the combination of dye concentrations. In such a way, a means for modifying the amount value of color material discharged onto a recording medium or the maximum value thereof is provided.

(2) When a color material of relatively low dye concentration is used as a further improved aspect, color separation is carried out into primary color components or secondary color component for each pixel and the maximum printing amount of color material is determined for each of these n-order colors rather than according to a simply increasing method of the maximum printing amount corresponding to the ratios of the respective dye concentrations. This determination is featured not by a simple increase in the maximum printing amount but in that the printing amounts are independently increased while restricted in such a manner as to finally reach to the respective maximum obtainable amount for individual n-order colors. According to this manner, even by using color materials of relatively low-concentrations, the optical reflection densities can be obtained which are almost equal to those obtained when using color materials of relatively high concentrations, and moreover it is enabled to suppress an increase in the printed amount of ink and to save the running cost.

(3) For output from a color processing module represented by a printer driver or the like, the recorded data for individual colors can be switched between binary data and multivalued data according to the dye concentrations of color materials employed for recording. Furthermore, for modes more needed for gradation, a function capable of output in the form of multivalued data or in high-resolution data is provided.

Hereinafter, a suitable embodiment of the present invention will be described referring to the drawings.

Figure 3:
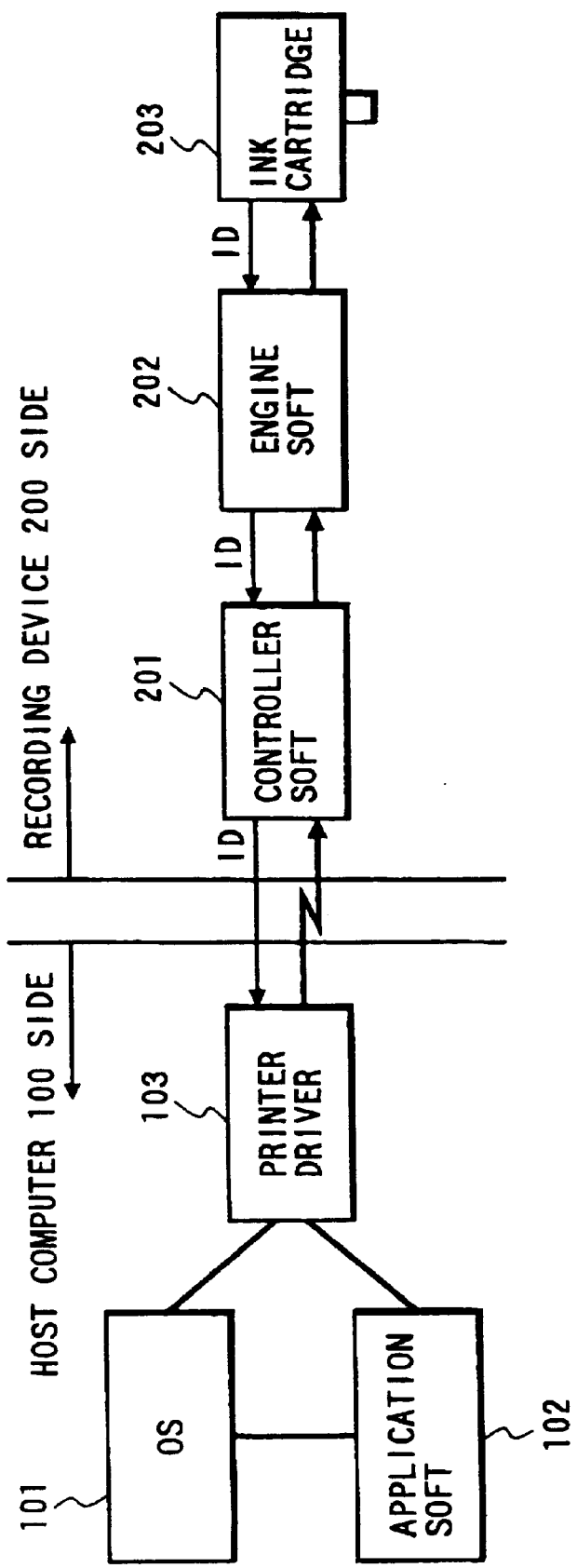
FIG. 3 is a block diagram showing the general configuration of a recording system including a host computer and an apparatus for making a halftone recording according to another embodiment of the present invention.

FIG. 3 is an illustration of the functional configuration of a recording system comprising a host computer 100 and an apparatus for making a halftone recording (ink-jet printer) 200.

Referring to FIG. 3, generally in a host computer 100, the exchange of various data and the control are carried out between an OS (Operation System) 101 and an application software 102 operating on the OS 101, while record data are exchanged from the OS 101 and the application software 102 to a printer driver 103 and vice versa, and transmitted to an apparatus for making a halftone recording 200 through the-printer driver 103.

Hereinafter, when executing the printout of a color image by using the application software 102 for dealing with a pictorial image in the apparatus for making a halftone recording 200, the flow of data will be described.

In the case of a pictorial image, image data prepared/edited on the application software 102 are sent to a printer driver 103 as multivalued RGB signals. Multivalued data received from the application software 102 are subjected to color processing by this printer driver 103 and further to halftone processing, usually converted to binary C (cyan), M (magenta), Y (yellow) and K (black) signals and delivered to the interface for an apparatus for making a halftone recording 200 in the host computer 100 or to the interface of a storage for files or the like.

In this embodiment, a signal is outputted to the interface for the apparatus for making a halftone recording 200 and data are sent to a controller software 201 in the apparatus for making a halftone recording 200 to check the matching thereof with the record mode or the ink cartridge 203. Thereafter, the case of delivering data to the engine software 202 is shown. The engine software 202 receives these delivered data as the record mode and data structure specified by the controller software 201 and converts the record data into a pulse for discharge to deliver it to the-ink-cartridge (recording head) 203 to execute the recording. In response to this, color materials are so arranged as to be discharged from the ink cartridge 203. By contraries, the ID information of the ink cartridge 203, the ink tank ID information and so on are sent to the engine software 202 and the assignment of memories or various optimizations is fulfilled on the basis of the information of the head cartridge 203. Furthermore, the relevant information is sent to the controller section and used as information for decoding the data sent from the printer driver 103 by referring to print instruction or the like.

Figure 4:
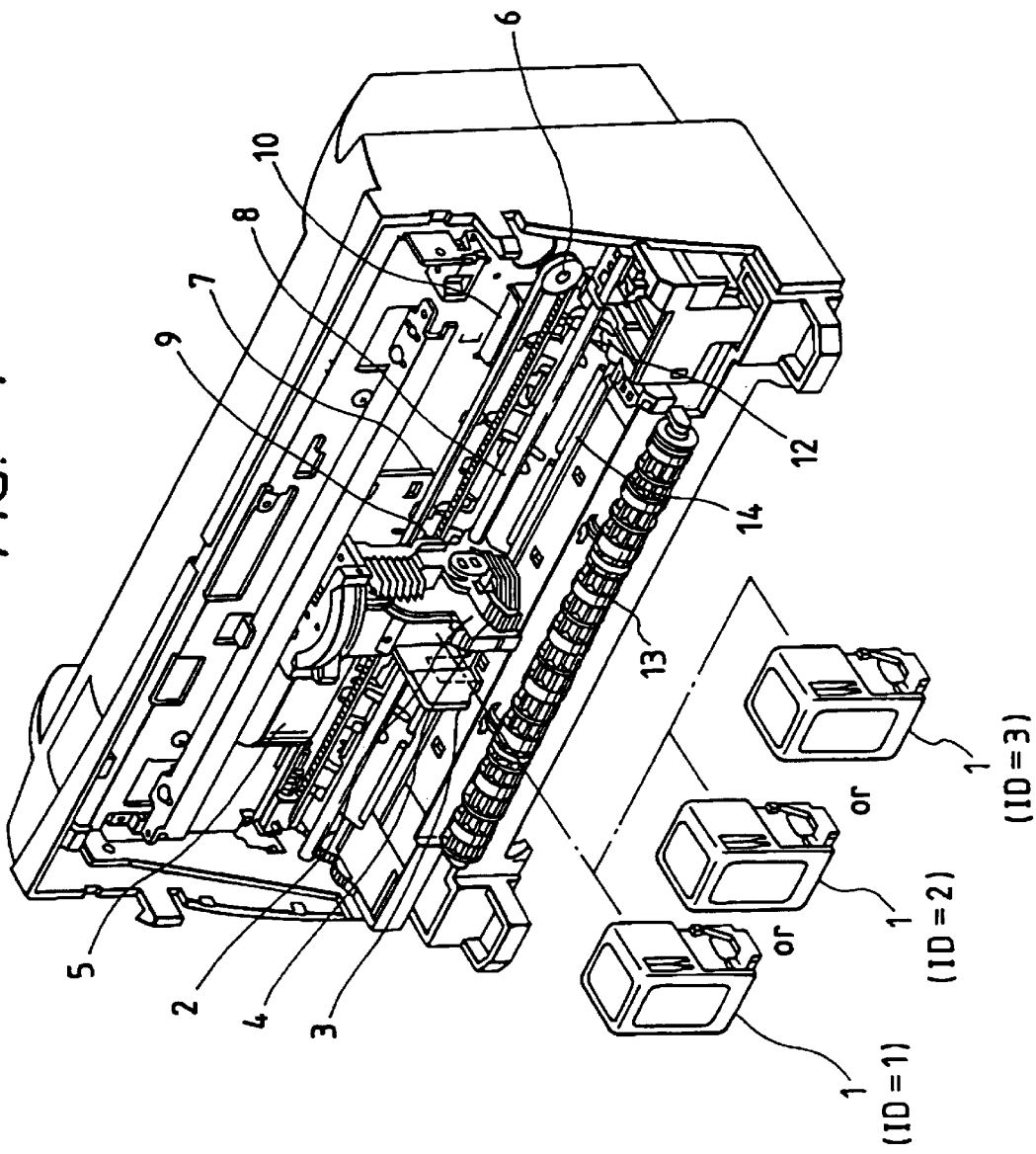
FIG. 4 is a perspective view showing the constitution of a mechanism section with the front cover removed in an ink-jet apparatus according to another embodiment of the present invention.

FIG. 4 is an illustration of the mechanical constitution of an appropriate ink-jet printer 200 of cartridge replaceable type according to Example 3 and shows a state that the interior of the apparatus constitution is made visible with the front cover of the ink-jet apparatus being removed.

In FIG. 4, a replaceable type ink cartridge 1 (equivalent to 203 in FIG. 3) comprises an ink tank section for storing ink and a recording head.

A carriage unit 2 as the loading section, mounting the ink cartridge 1, travels side to side to execute the recording. A holder 3 for fixing the ink cartridge 1 operates in interlocking with a cartridge fixing lever 4. In other words, after mounted in the carriage unit 2, the ink cartridge 1 is so arranged as to be pressed onto the carriage unit 2 by operating the cartridge fixing lever 4. With this arrangement, an attempt is made to obtain the positioning of the ink cartridge 1 and the electric contact between the ink cartridge 1 and the carriage unit 2. A flexible cable 5 is provided for the transmission of electric signals to the carriage unit 2. A carriage motor 6 causes the carriage unit 2 to travel back and forth in the main scanning direction by its rotation. A carrier belt 7 is driven by the carriage motor 6 in such a manner as to move the carriage unit 2 side to side. A guide shaft 8 is provided for the slidable support of the carriage unit 2. A home page sensor 9 is provided with a photocoupler for positioning the home position of the carriage unit 2. A shading plate 10 for detecting the home position, when the carriage unit 2 reaches the home position, screens the photocoupler provided on the carriage unit 2 and thus it is detected that the carriage unit 2 reaches the home position. A home position unit 12 includes the restoration mechanism for the recording head of the ink cartridge 1. A paper expel roller 13 for expelling a recording medium serves to sandwich a recording medium together with a spur unit (not shown) and expel it outside the apparatus for making a halftone recording. An LF unit 14 is a unit for conveying a recording medium by a determined amount in the subscanning direction.

Figure 5A:
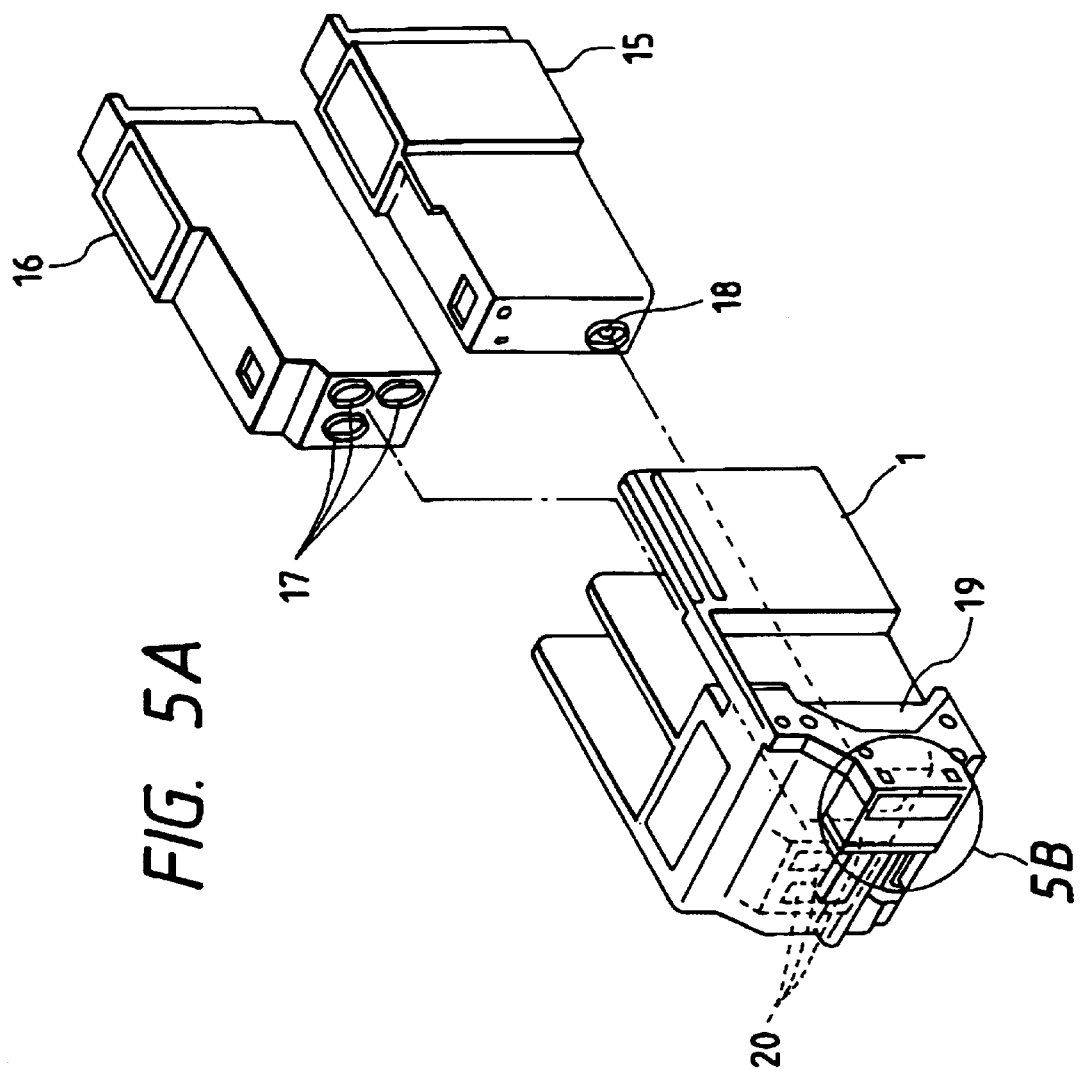
FIGS. 5A and 5B are perspective views of an ink cartridge and an ink tank in an ink-jet apparatus according to another embodiment of the present invention.
Figure 5B:
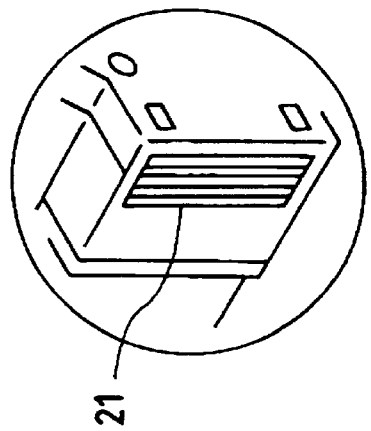

FIGS. 5A and 5B are a detailed drawing of an ink cartridge 1 employed in Example 3.

In FIG. 5A, numerals 15 and 16 denote a replaceable ink tank for black (Bk) ink and replaceable ink tank for C, M and Y inks, respectively, and coupling ports 17 and 18 (color material feed ports) of the ink tank 16 and a coupling port (color material feed port) of the ink tank 15, respectively, in which the coupling port 17 is linked with the ink cartridge 1 for the feed of color materials. The coupling ports 17 and 18, linked with a feed pipe 20, are so arranged as to feed color materials to the recording head section 21. A contact section 19 for electric signals is connected to a flexible cable 5 and is so arranged as to transmit various signals to the ink cartridge 1. FIG. 5B is an enlarged drawing of the recording head 21.

Figure 6B:
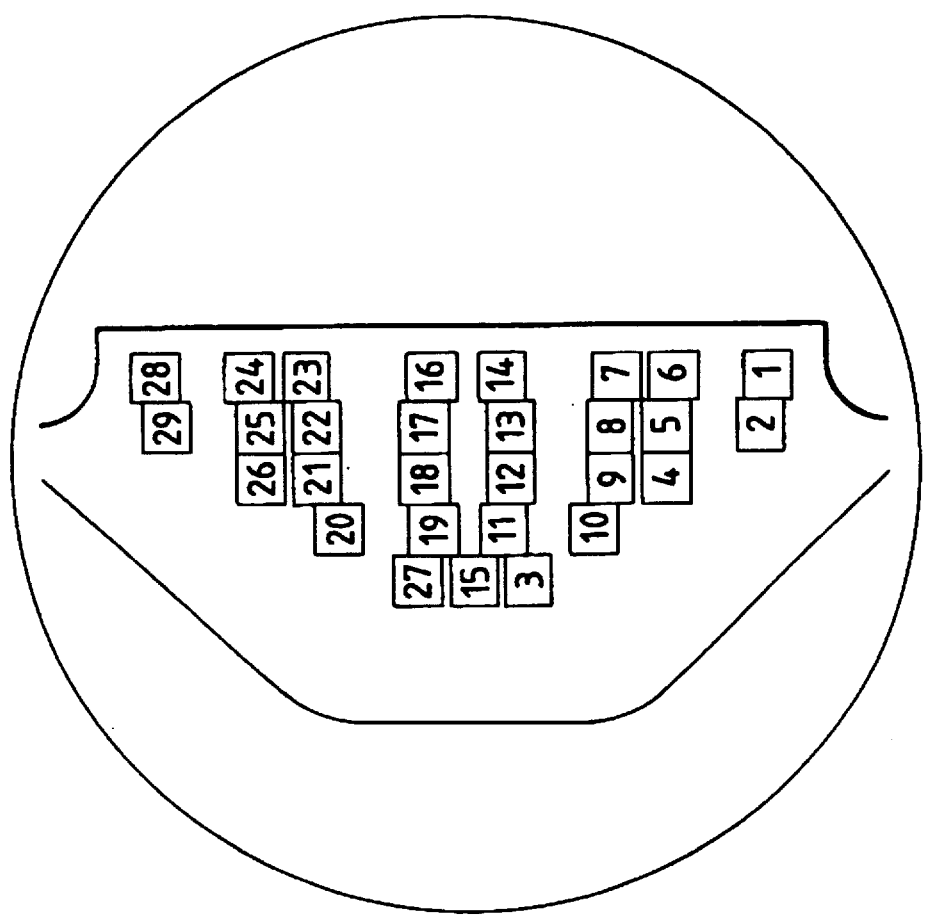
FIGS. 6A and 6B are drawings showing the contact section of an ink cartridge in an ink-jet apparatus according to another embodiment of the present invention.
Figure 6A:
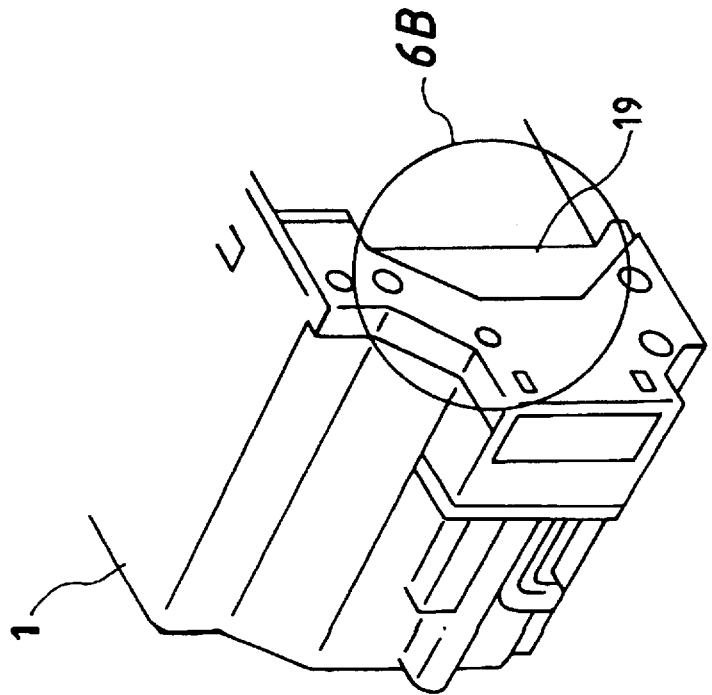

FIGS. 6A and 6B are detailed drawings of the contact section 19 of the ink cartridge 1.

On this contact section 19, a plurality of electrode pads are provided and a signal related to the ink discharge, an ID signal for identifying the ink cartridge 1 or the like is exchanged through these electrode pads of the contact section 19 with the main body of the ink-jet apparatus. FIG. 6B is an enlarged drawing of the contact section 19.

FIGS. 7A and 7B are illustrations of another method for detecting the classification of ink tanks in the ink cartridge 1 employed in Example 3.

The ink tanks 15 and 16 are mounted to the ink cartridge 1 and fixed thereon by the engagement of a hook 70 with protrusions 73 of the tanks. In the acting direction of a force of this hook 70, a contact section 71 for detecting the classification of a mounted tank is provided. This contact section 71 for the detection of a tank is provided on both sides of the ink cartridge 1 and the ink tanks 15 and 16. FIG. 7B is an enlarged drawing of the contact section 71 and shows that three electrode pads comprising an electrode pad 1, an electrode pad 2 and an electrode pad 3 are provided. Although not shown in FIG. 7B, the same number of the electrode pads are provided on the side of the ink cartridge 1 and electrically connected to the former one in the contact section 71. Here, in the contact section on the side of the ink tanks 15 and 16, the electrode pad 1 and the electrode pad 2 are in the conductive state, but the electrode pad 3 is to be insulated. For example, let such a state be an ink tank in which normal ink is injected. By the current conduction to these electrode pads via the contact section on the side of the cartridge 1 in contact therewith, an ink-jet apparatus according to this embodiment can detect what type of ink is stored in the mounted ink tank.

That is, in the example of FIGS. 7A and 7B, current flows between the electrode pad 1 and the electrode pad 2, but does not flow between the electrode pad 1 and the electrode pad 3 or between electrode pad 2 and the electrode pad 3. This state is stored beforehand by the main body of the ink-jet apparatus in ROM or the like as a case where a normal ink tank is attached. In contrast, with an ink tank in which a pale ink is injected, it becomes identifiable that this differs from a normal ink tank, e.g., by making the electrode pad 3 into a conductive state.

And, in the aspect of this embodiment, the number of electrode pads for the identification of ink tanks is set to three, but an increase in the number of electrode pads enables a greater number of ink tank types to be identified.

Furthermore, by examining the conducting state via the contact section 19 shown in FIG. 6A, it is possible to detect whether the ink cartridge 1 was replaced or not.

FIG. 8 is a flowchart showing one example of image processing by the image processing module in a printer driver 103 according to this embodiment.

First, at the step S101, the luminosity signals of RGB, i.e., the input signals of 24 bits in total comprising 8 bits for each of RGB-colors, are subjected to the luminosity density conversion, and converted into the density signals of CMY signals, i.e., the total of 24 bits comprising 8 bits for each of CMY colors, or into those of the total of CMYK 32 bits comprising 8 bits for each of CMYK colors. Next, at the step S102, the masking processing is carried out to perform a correcting treatment for unnecessary color components of dyes in each of CMY color materials. Then, the procedure advances to the step S103, UCR/BGR processing is carried out to remove the ground color and extract the black component. And at the step S104, the respective printing amounts of primary colors and secondary colors are limited differently in each pixel. Here, the printing amount is limited to 300% for primary colors and to 400% for secondary colors.

Next, at the step S105, the output gamma modification proceeds to modify the output characteristic in such a manner as to become linear. Here, the multivalued output of 8 bits is accomplished for each color. Then, the procedure advances to the step 106, 8-bit signals are subjected to the halftone processing to convert data for each of CMYK colors into 1 or 2 bits signals. At that time, at the step S106, the halftone processing is accomplished by using the error distribution method, the dither method or the like.

FIG. 10 is a classified illustration of the switching control to be executed in the control section of an apparatus for making a halftone recording according to a head identification signal or an ink-tank identification signal (ID signal) from the contact section 19 of the ink cartridge 1.

In this example, the identification with ID is made by using four IDs and only three IDs (in the case of color images) are shown out of them. The case of ID=0 (not shown) shows an exclusive cartridge for monochrome, whereas the cases of ID=1, 2 and 3 show color cartridges. FIG. 10 shows an example of classification in the case of color cartridges. Here, with an increase in ID No., at least one coloring matter concentration is set to decrease.

In Example 3, the cartridge of ID=1 is selected to an ink cartridge of dye concentration (high concentration) used by a conventional color printer. ID=2 indicates the case of an ink cartridge or ink tank of low coloring matter concentration for other color materials than yellow one. ID=3 indicates that of an ink cartridge or ink tank for storing ink of still lower coloring matter concentration, employed for the recording of an orthodox pictorial image in Example 3.

According to individual ID values defined like this, first, the difference in coloring matter concentration is identified.

The difference in coloring matter concentration referred to as here means the difference in maximum optical reflection density for each primary color and may be accompanied with the modification in coloring matter itself. In this meaning, these ID values can be referred to as the differences in the maximum optical reflection density of individual primary color materials or the differences in the maximum value of saturation. Incidentally, with Example 3, for the simplification of explanations, they are defined as differences in concentrations of coloring matters.

With ID=1 and ID=2, the coloring matter concentration for yellow is the same (2.5% by weight), that of ID=2 is one third the one of ID=1 for magenta, equally one third for cyan and about a half for K (Bk). With ID=1 and ID=3, the coloring matter concentration for yellow is the same (2.5% by weight), that of ID=3 is about a quarter of the one of ID=1 for magenta, equally about a quarter for cyan and about a quarter for K (Bk).

Figure 9:
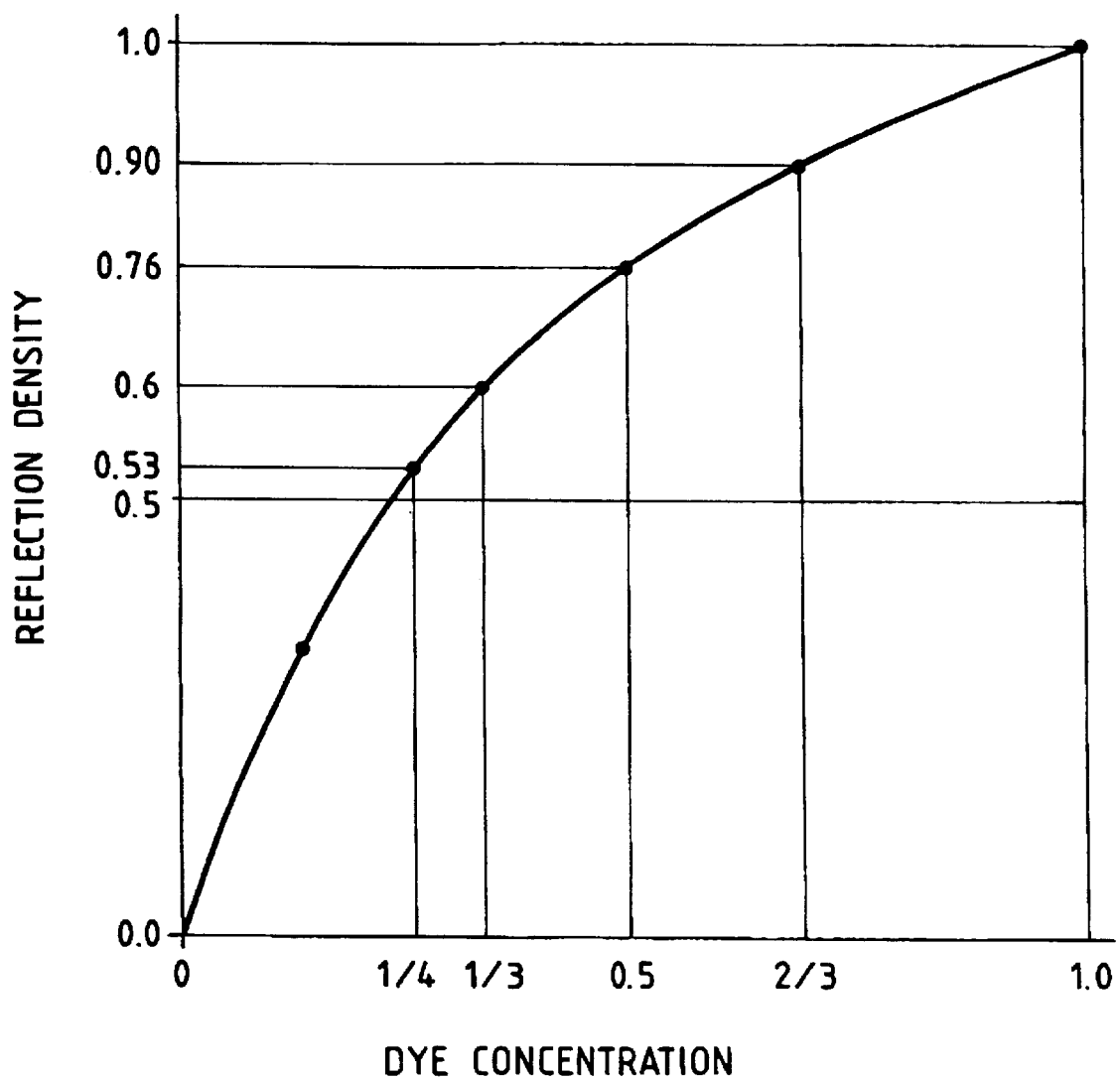
FIG. 9 is a graph explaining the relation between a dye (coloring matter) concentration of ink and a reflection density in another embodiment of the present invention.

As shown in FIG. 9, such a relation holds in this embodiment that the optical reflection density is reduced to about 76% at a. half of the coloring matter concentration, to about 60% at one third, to about 53% at a quarter and to about 90% at three fourth. This relation is substantially same independently of color sorts.

In FIG. 10, the portion indicated as "data" shows the depth in the structure of data sent from the printer driver 103 to the apparatus for making a halftone recording 200 for each ID. This represents the changes caused by modifying the maximum printing amount while raising the gradation degree with. a modified coloring matter concentration in color material. At that time, a change accompanying the modification of the discharge amounts of color materials by means of the ink cartridge may be added. Also in this case, the results basically depend on what amount of each color material, more specifically a coloring matter, has been printed per area and thus is included in the category of the present invention. In this embodiment, the case of a constant ink discharge amount will be described. In this embodiment, the resolving power is set to 360×360 dpi independently of the value of ID, while ID=1, ID=2 and ID=3 are let corresponding to binary data, tetravalued data and pentavalued data, respectively.

As an alternative embodiment for rasing the grading number, an almost similar effect can be obtained by increasing the resolving power while the number of data gradation fixed at binary value for each.

Next, "corresponding media" in FIG. 10 represents recording media well-adapted to the ink cartridge 1 for each ID.

This selection standard for well-adapted media is considered from various angles, but is distinguished by the difference in maximum color material absorption amount here. In this embodiment, media for pictorials (pictorial paper) exhibits the greatest color material absorption amount of about 500% and coat paper exhibits the next greatest amount of about 400%. And plain paper exhibits the smallest amount of about 200%.

Furthermore, "maximum printing amount" in FIG. 10 differs individually with CMYK and RGB. These numerals show the maximum printing amounts for each pixel restricted within the printer driver 103. As invariant representations, modification is applied to the area density of a color material corresponding to each concentration in such a manner that the amount of coloring matter becomes almost equal in a portion showing the same concentration. This embodiment (cases of ID=2 and 3) is characterized in that the maximum printing amount for secondary colors (RGB) is not double that for primary colors (CMYK) in contrast a conventional case (ID=1).

As evident from FIG. 10, the relation to modification between the "concentration of coloring matter" and the "maximum printing amount" is as follows.

When the coloring matter concentrations of color materials of substantially same hue (almost identical color) are compared between different IDs in chromatic colors of cyan, magenta and yellow (hereinafter, designated with C, M and Y), the ratios of at least one color material higher in coloring matter concentration to color materials lower in coloring matter concentration are evaluated and the maximum printing amount is modified above the sum of the maximum value and the minimum value of the ratios.

For example, in comparing the cartridge of ID=1 and that of ID=2, color materials of substantially same hue, having the greatest coloring matter concentration are C and M. This ratio is "3" for M and "3" also for C (the maximum). And the minimum is "1" for Y. Accordingly, the maximum and the minimum sums to 4. Thus, in this case, the maximum printing amount becomes above four (=3+1) times, i.e., above 400%. To be specific, in the case of I=2, the maximum printing amount is set to, 3-times, i.e., "300%" for primary colors (CMY) and 4-times, i.e., "400%" four secondary colors (RGB) as that of ID-1.

By determining the maximum printing amount like this, for primary colors of C and M, images having substantially same optical reflection density as with the use of an ink cartridge storing a high coloring matter concentration of ink like ID=1 can be obtained.

And for Y, since the case of ID=2 is similar to that of ID=1, the maximum printing amount is allowed to remain at "100%". That is, if explained in the case of FIG. 9, recording by the 3-time discharge of ink having a ⅓ dye concentration results in about three times of discharged dye amount, and finally, about 3-time optical reflection density is considered to be obtained because the moisture in diluted solution and such others is absorbed by the recording medium or evaporated. As evident also from FIG. 9, the reflection density reached "0.9" or more and is almost saturated for a dye concentration of not lower than ⅔, so that the difference in reflection density due to different dye concentration becomes hardly noticeable.

Next, the case of secondary colors, e.g., red, green and blue (hereinafter, abbreviated as R, G and B) will be considered. The maximum printing amount exhibited with these secondary colors corresponds to the ink absorbability of the respective recording media. That is, if explained in examples of FIG. 10, plain paper is the lowest (200%) in ink absorbability, coat paper is the next lowest (400%) and pictorial paper is the highest (500%).

First, with respect to R color, R is represented as (M+Y) by using coloring matters of ink. Here, as mentioned above, Y is high in coloring matter concentration (high in lightness) and accordingly the maximum printing amount is 100%. And the maximum printing amount for M is set to 300%. Thus, R, i.e., (M+Y), is expressed in 400% and the optical reflection density almost equal a value of R in the case of ID=1 can be obtained. Similarly with respect to G, because G is represented as (C+Y) and the maximum printing amount for C is set to 300%, the maximum printing amount for C becomes 400% and the optical reflection density almost equal a value of G in the case of ID=1 can be obtained. Furthermore, in the case of B, the maximum printing amount becomes 600% (=300%+300%) because of being represented as (C+M), but the optical reflection density is not raised for such an increase in ink printing amount. Thus, in practical use, it is more adequate to set this amount to 400% from a consideration that (C+M=200%+200%). The optical reflection density of pixels recorded with this setting amounts to about 90% of the case of using an ID–1 ink cartridge.

Also, the case of using an ID=3 ink cartridge is calculated similarly. That is, from a consideration of the relation between the case of ID=1 and that of ID=3, the maximum printing amount becomes 400% or more for primary colors (C, M) and 500% for secondary colors (RGB). In this case, the optical reflection density almost equal to that of the case of ID=1 is obtained except for B of secondary color, but for B, the maximum printing amount may be set to 600% because the optical reflection density slightly lowers as compared with the case of ID=1. "Corresponding media" are defined by changing the amount of maximum printing shown in FIG. 10. If more pictorial image is required, you may use the optical "corresponding media" for the pictorial image by lowering the coloring matter concentration and modifying the maximum printing amount according to the concentration.

In any case, such modification of the maximum printing amount will enable the greatest possible effect to be obtained.

Actually, even if the amount of maximum printing onto recording media is not ideally modified, the design of images may be made at a somewhat lower level than an ideal output data curve by clipping the data of upper grading (higher concentration) of those outputted for the input as shown in FIG. 9, or by using a high-order curve for the setting of output data.

Even when a rise in maximum printing amount is suppressed by clipping, an equivalent effect can be obtained to a certain level of-grading.

In this case, it is possible to keep the coloring matter concentration per area at an almost equal level before the clipping.

Figure 11B:
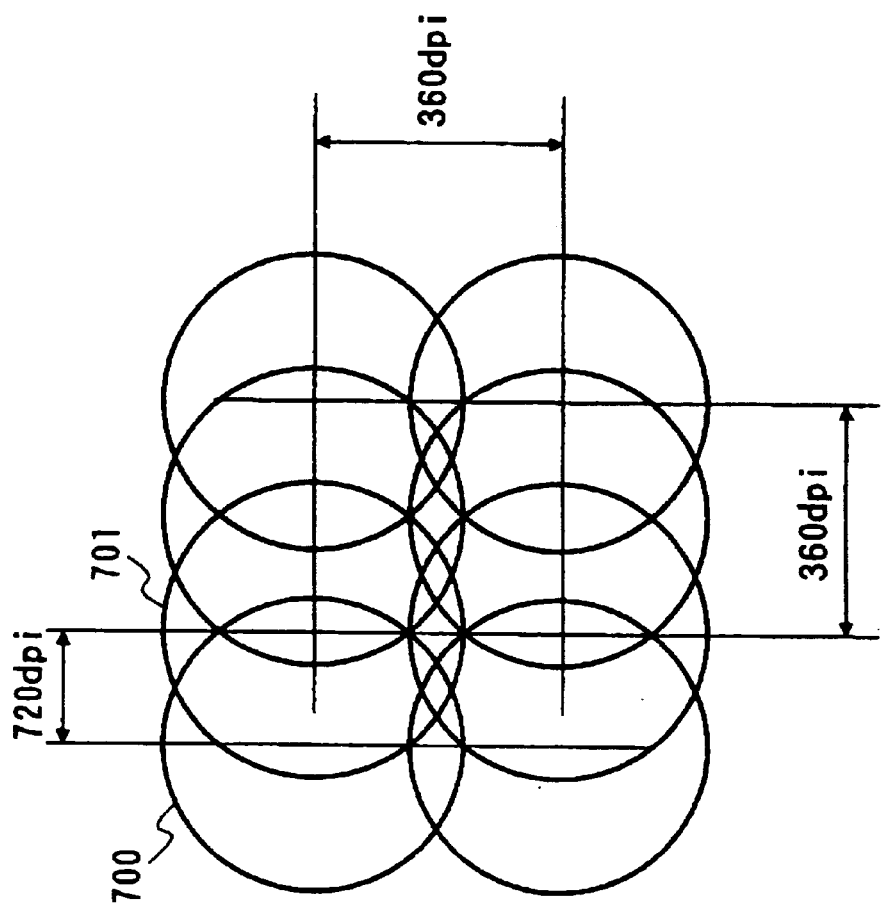
FIGS. 11A and 11B are drawings showing dispositions of dots recorded on a recording medium in an ink-jet apparatus according to another embodiment of the present invention, where
Figure 11A:
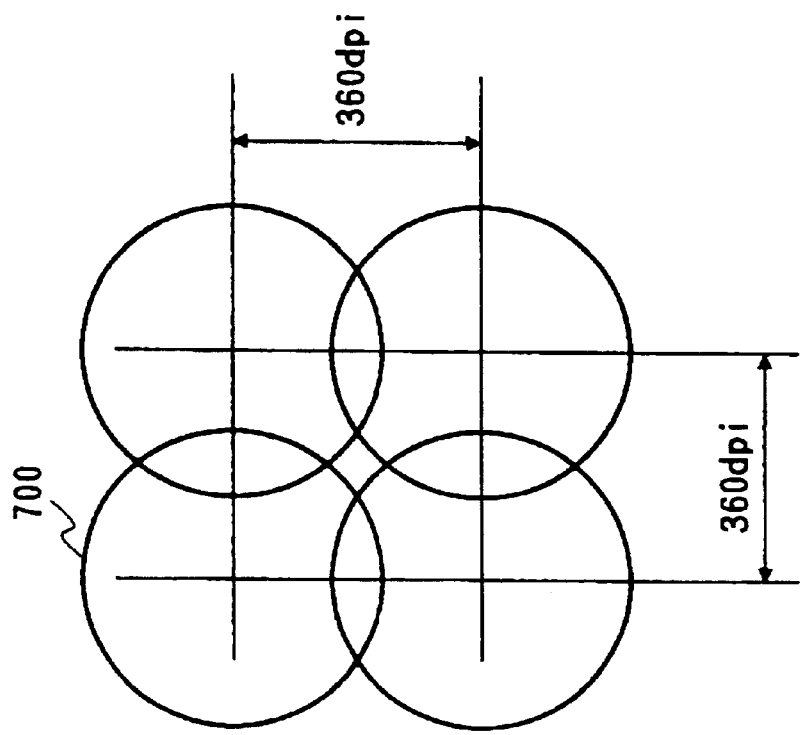

FIGS. 11A and 11B are illustrations of disposition of recorded dots.

FIG. 11A shows the disposition of dots on a recording medium when binary data are recorded in 360 dpi×360 dpi, whereas FIG. 11B shows the disposition of dots on a recording medium when tetravalued data or pentavalued are recorded in 360 dpi×360 dpi.

FIG. 11A corresponds to the case of a printing ratio at which one dot is assigned to each pixel and this state is defined as 100%. Accordingly, the case of FIG. 11B becomes 200%. Incidentally, if the discharge amounts of ink are modified in any case of binary, tetravalued or pentavalued data, values of the respective modified ratios multiplied by 100% may be employed in operation even if there are all different dots that correspond to individual pixels.

FIGS. 12A to 12C are illustrations of a relation between the disposition of dots actually recorded on a recording medium and the data format in an ink-jet apparatus 200 according to Example 3.

FIG. 12A shows binary data of 360 dpi, FIG. 12B shows tetravalued data of 360 dpi similarly and FIG. 12C shows one example of pentavalued data of 360 dpi. Here, binary data of FIG. 12A are recorded by using the dot disposition shown in FIG. 11A. In this case, since data of individual pixels and dots recorded are in one-to-one correspondence with each other, there is no recorded dot for data of "0" and one dot is recorded at each pixel position of 360 dpi×360 dpi for data of "1". In this embodiment, such a recording method is executed when an ID=1 ink cartridge 1 is mounted and used for recording.

FIG. 12B shows the recording in tetravalued data, executed when an ID=2 ink cartridge 1 is mounted. In the case, tetravalued data are given in two-bit signal and recorded as subdots recorded at addresses (700 of FIG. 11B) corresponding to 360 dpi×360 dpi pixels and recorded at addresses (701 of FIG. 11B) corresponding to 720 dpi×360 dpi pixels. That is, there is no dot for data of "00", one dot is disposed at each address corresponding to 360 dpi×360 dpi for data of "01". For data of "10", data are decoded in an ink-jet apparatus and one dot is disposed for each address (700) of 360 dpi×360 dpi and for each address (701) of 720 dpi×360 dpi, respectively. This state becomes a 200% ink printing state to 360 dpi×360 dpi (FIG. 11A). Furthermore, for data of "11", two dots are recorded in overlap at each address (700) of 360 dpi×360 dpi and one dot is disposed at each address (701) of 720 dpi×360 dpi. In this way, a 300% ink printing is attained to FIG. 11A.

In the case of FIG. 12C, an example of pentavalued output in four-bit data is shown, but another method is possible. This recording of FIG. 12C differs from the record in FIG. 12B in that for the "1000" recording of pentavalued data, two dots are printed in overlap both at each address (700) corresponding to 360 dpi×360 dpi and at each address (701) corresponding to 720 dpi×360 dpi. Thereby, in the case of pentavalued data, the maximum 400% ink printing becomes possible in primary colors. Needless to say, dots may be disposed by the decode of FIG. 12B. In FIGS. 12A to 12C, the marks "⊚", "○" and "×" mean 2-dot overlap printing per pixel, 1-dot per pixel and no dot, respectively.

Incidentally, since the overlap printing of two dots at one pixel position is required for the above recording of elevated gradation, the recording by the well-known multi-path becomes essential. As another execution method, one path recording in the same number of paths with the arrangement density of recording elements increased for each cartridge, or multi-path recording may be employed.

For example, for an elevated gradation in use of a cartridge at the 360 dpi pitch of recording element interval, the present invention may be put into practice by using a cartridge at the 720 dpi pitch.

Figure 13:
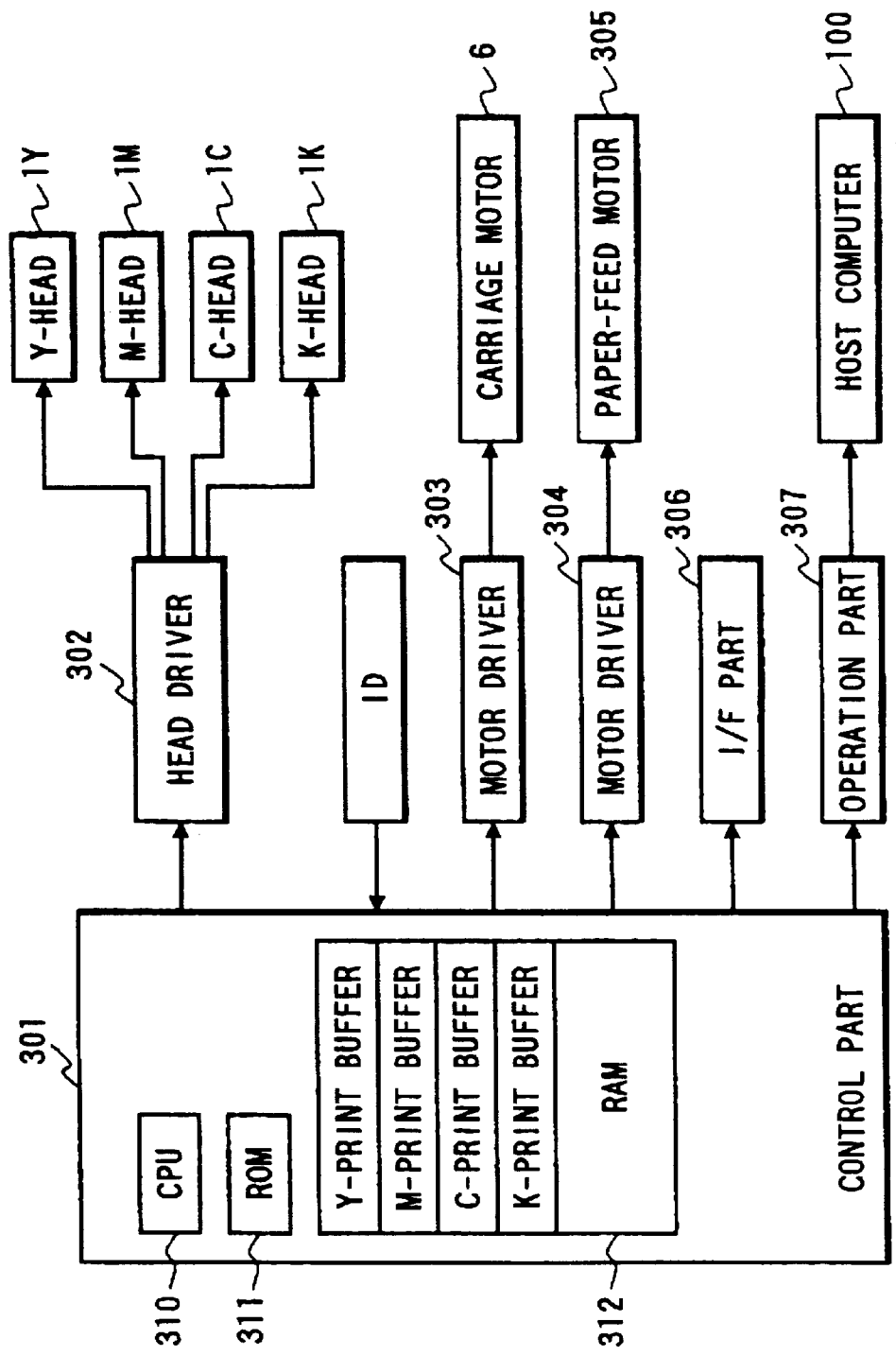
FIG. 13 is a block diagram showing a configuration of an ink-jet apparatus according to another embodiment of the present invention.

FIG. 13 is a block diagram showing the configuration of an ink-jet apparatus 200 according to Example 3 and parts in common with the above-drawings identified by the same numeral.

A control section 301 for controlling the operation of the whole apparatus comprises a CPU 310 such as microprocessor, a ROM 311 for storing a control program or various data to be executed by the CPU 310 and a RAM 312 used as a work area during the execution of various processing by the CPU 310 which temporarily holds various data. In this RAM 312, a receive buffer for storing the record code received from a host computer 100, printer buffers corresponding to individual colors Y, M, C and K for storing print data (image data) in correspondence to recording heads 1Y, 1M, 1C and 1K for recording in the respective colors of YMCK and such others are provided.

A head driver 302 constitutes printing amount control means together with a control section 301 and drives a recording head 1Y for yellow color, a recording head 1M for magenta color, a recording head 1C for cyan color and a recording head 1K for black color in response to print data of individual colors outputted from the control section 301.

Motor drivers 303 and 304 rotationally drive their corresponding carriage motor 6 or paper feed motor 305, respectively. An interface. (I/F) section 306 controls the interface between an ink-jet apparatus 200 and a host computer 100 according to this embodiment. An operating section 307 is equipped with various keys operated by a user or indicators such as liquid crystal display.

Figure 14:
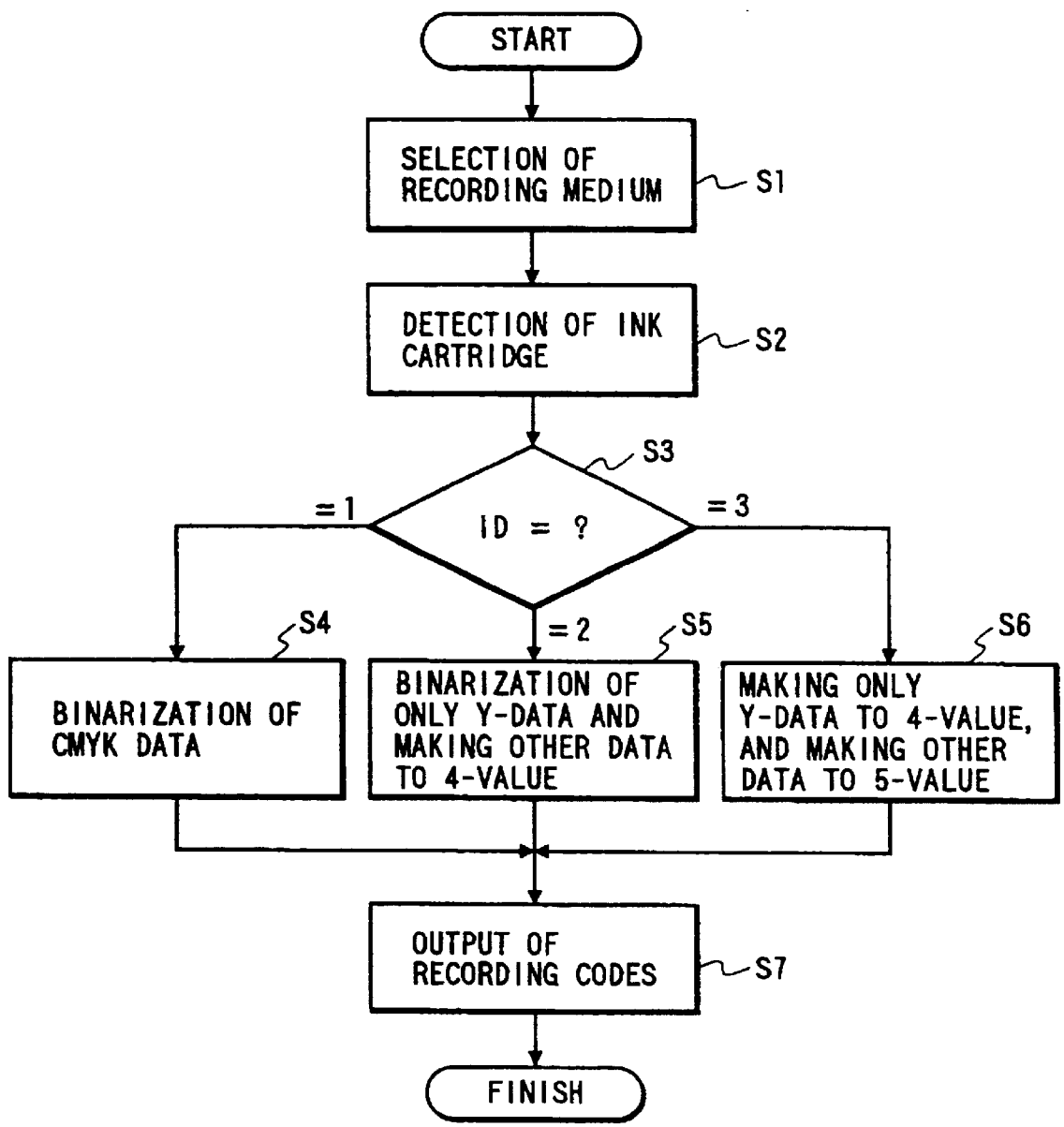
FIG. 14 is a flowchart showing the processing in a printer driver of a host computer according to another embodiment of the present invention.

FIG. 14 is a flowchart showing the preparing processing of record codes to be executed by a host computer 100 according to the present invention.

First, at the step S1, a recording medium used in the apparatus for making a halftone recording 200 is specified and at the step S2, the ID of the ink cartridge 1 (shown in FIG. 4) loaded on the apparatus for making a halftone recording 200 is discriminated on the basis of a signal from the apparatus for making a halftone recording 200. Such discrimination of a cartridge, specification of a medium or the like is indicated by setting the mode of the apparatus for making a halftone recording 200 or the like, for example, on the screen displayed by the OS 101 of the host computer 100 (shown in FIG. 3). Next, at the step S3, according to the ID of the ink cartridge 1 loaded on the apparatus for making a halftone recording 200, image data are coded as, e.g., for an ID=1 cartridge, the procedure advances to the step S4 and image data of individual color components are converted in binary data as is well known already.

On the other hand, when an ID=2 cartridge 1 is loaded at the step S3, the procedure advances to the step S5, Y data are converted into binary data and the record data corresponding to other colors are converted into tetravalued data. Alternatively, when an ID=3 cartridge 1 is loaded at the step S3, the procedure advances to the step S6, Y data are converted into binary data and the record data corresponding to other colors are converted into pentavalued data. Based on record data converted at any of the steps S4, S5 and S6 in this way, record code is prepared at the step S7 and transmitted to the apparatus for making a halftone recording 200 via the interface 306 (shown in FIG. 13).

Figure 15:
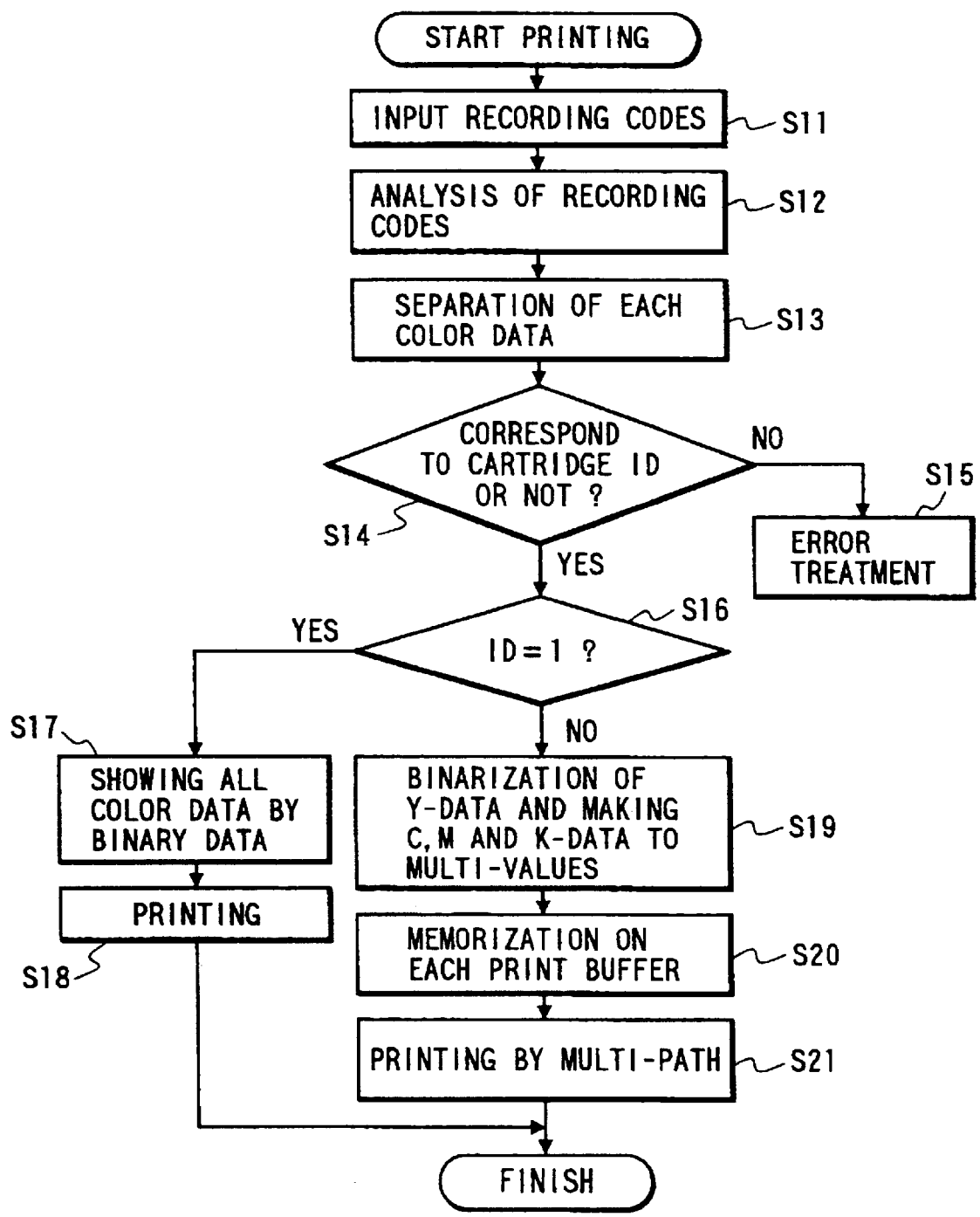
FIG. 15 is a flowchart showing the processing in an ink-jet apparatus according to another embodiment of the present invention.

FIG. 15 is a flowchart showing the recording processing in an ink-jet apparatus 200 according to this embodiment. The control program for executing this processing is stored in the ROM 311 (shown in FIG. 13).

First, at the step S11, the record code received from the host computer 100 and stored in the receive buffer is read out and at the step S12, the record code read out is analyzed. Then, the procedure advances to the step S13 and according to the analyzed result, the record code is converted into print data corresponding to individual colors. In this way, the procedure advances to the step S14 and on the basis of the received data, it is decide whether the recording is allowable on the ink cartridge 1 (shown in FIG. 4) loaded currently or not. If not, error indication or the like is made to. the operating section 307 (shown in FIG. 13) at the step S15 and the procedure ends.

If the record using the loaded cartridge 1 is allowable, the procedure advances to the step S16, it is assured whether the cartridge ID is "1" or not. If so, the procedure advances to the step S17, all color data are converted into binary print data and expanded to the print buffer, and at the step S18, recording by ordinary one path is carried out.

On the other hand, if the cartridge ID is not "1", the procedure advances to the step S19, Y data alone are converted into binary data and other color data are converted into tetravalued or pentavalued data. Incidentally, this processing may be uniquely determined with a recording code or may singly proceed on the basis of the ID of the loaded cartridge on the apparatus for making a halftone recording side. In this way, the procedure advances to the step S20 and print data with individual colors expanded into patterns according to the loaded cartridge are stored in the print buffer corresponding to individual colors. And, the procedure advances to the step S21 and referring to FIGS. 11A to 11C and 12C, the relevant multivalued data are printed by the multi-path.

Figure 16B:
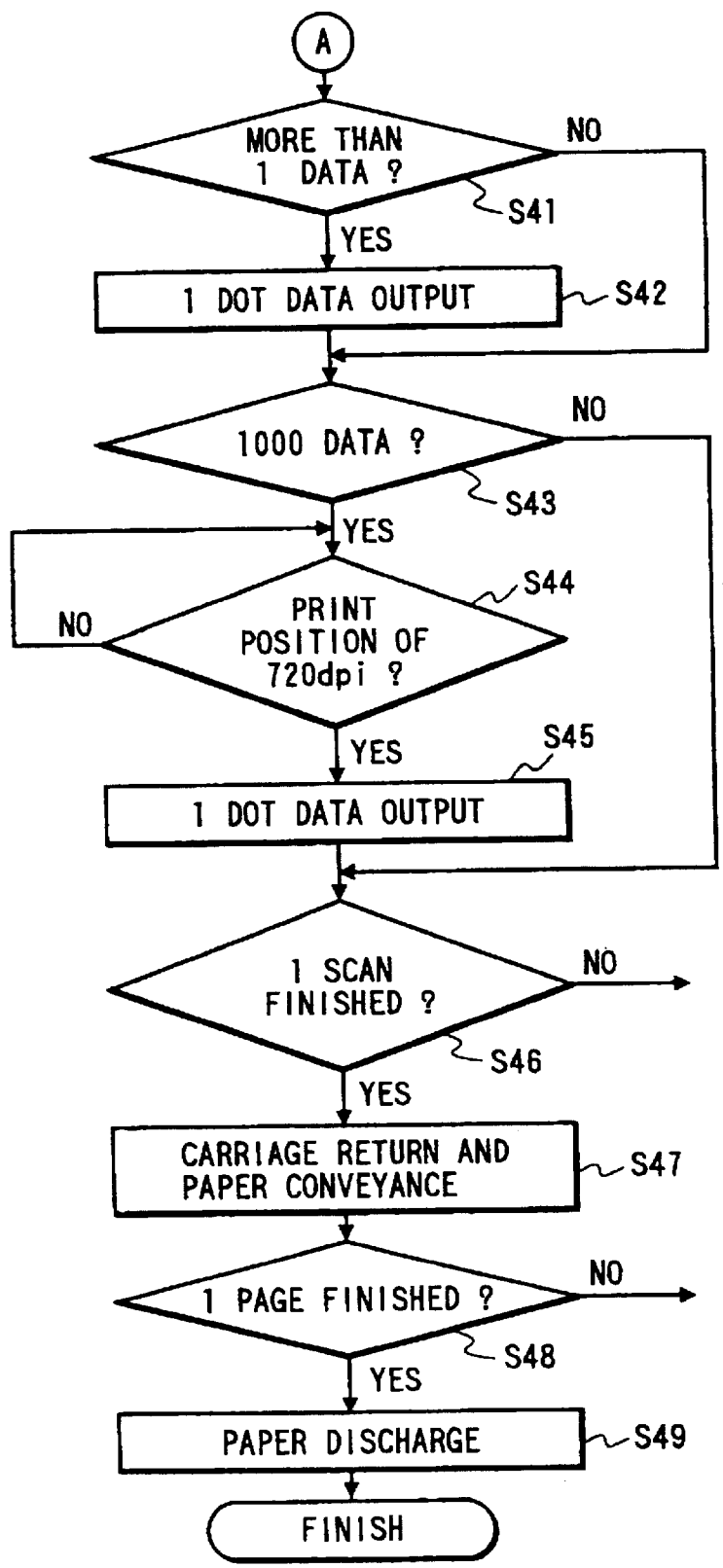
FIG. 16, comprised of FIGS. 16A and 16B, is a flowchart showing the processing of multi-path recording in an ink-jet apparatus according to another embodiment of the present invention.

FIGS. 16A and 16B are flowcharts showing the recording processing by such multi-path (step S21).

First, at the step S31, the drive of a carriage motor 6 (shown in FIG. 4) starts, then at the step S32, the print data of individual colors to be recorded in the next is read out from the print buffer corresponding to each color to check that the print timing of recording at the resolving power of 360 dpi (at location 700 in FIG. 11B) turns on. If the print timing turns on, the procedure advances to the step S33 and the print data corresponding to into individual colors are outputted to the respective heads 1Y, 1M, 1C and 1K via the head driver 302 to record dots at the positions designated with 701 in FIG. 11B (when data are neither "0" nor "00"). Next, the procedure advances to the step S34 to check that there is data not smaller than "10" in other color multivalued data than yellow. If not, only the print of a single bit is necessary shown in FIG. 12 and accordingly the procedure advances to the step S37 without any operation.

If there are data equal to or greater than "10", the procedure advances to the step S35 to check that the print timing of recording of 720 dpi dots turns on. If so, the procedure advances to the step S36 and the print data are outputted to the head 1M, 1C or 1B of corresponding color to execute the recording. In this way, the procedure advances to the step S37 to check that the recording processing for one scan portion is completed. If not, the procedure returns to the step S32 to execute the above-mentioned processing.

After the recording processing for one scan portion is completed at the step S37, the procedure advances to the step S38 to execute a carriage turn for returning the head to the home position. And the procedure advances to the step S39 to rotationally drive the carriage motor 6 again in the forward direction and at the step S40, it is checked that the carriage unit 2 reaches the recording position of 360 dpi similarly to the step S32. If so, the procedure advances to the step S41 to check that there are data not smaller than "11" in print data. If so, dot data are printed to the relevant position at the step S42.

Then, the procedure advances to the step S43 to check that print data include data of "1000" (maximum of tetravalued data). If so, the procedure advances to the step S44 to check that the recording timing of 720 dpi turns on. In this way, when the recording timing of 720 dpi turns on, the procedure advances to the step S45 to record one dot at the relevant position.

In this way, when one scan of recording is completed at the step S46, the procedure advances to the step S47 to execute a carriage turn for returning the carriage unit 2 to the home position and a paper feed motor 305 is driven to convey the recording paper by the recording element of a head for each color. Thereby, the record width of images by means of the recording head for each color has come to be recorded.

In this way, the procedure advances to the step S48 to check that one page of recording is completed. If not, the procedure returns to the step S1 and the print data of portion to be recorded by the next recording scan are prepared and stored separately in print buffers for individual colors. In this way, when one page portion of image recording ends, the procedure proceeds to the step S 49 to expel the recorded record paper and the processing ends.

Incidentally, in this embodiment, the processing in a host computer and the processing in a storage are separately described, but the present invention is not limited to this separation and such a function may be executed in an apparatus or one unit.

With these embodiments, especially in the ink-jet recording scheme, the provision of means (such as, e.g., electrothermal converter and laser beam) for generating thermal energy as energy used for the discharge of ink and the use of a scheme for causing a change in the state of ink by the above thermal energy enables a higher density and a higher fineness of recording to be attained.

As for the representative arrangement and principle, a conversion scheme using a fundamental principle disclosed, e.g, in U.S. Pat. Nos. 4,723,129 and 4,740,796 is preferable. This scheme is applicable both to the on-demand type and to the continuous type. Especially, in the case of on-demand type, this scheme is effective because thermal energy in the electrothermal conversion body is generated and film boiling is caused on the heat acting surface of an apparatus for making a halftone recording on application of at least one drive signal, corresponding to recording information and giving an abrupt temperature rise above the film boiling, to an electrothermal conversion body disposed corresponding to a sheet or liquid path for holding a liquid (ink), and consequently a bubble in the liquid (ink) can be formed which is in one-to-one correspondence to this drive signal. By the growth/contraction of this bubble, a liquid (ink) is discharged via the opening for discharge to form at least one droplet. If this drive signal is made into a pulse shape, the growth and contraction of a bubble is performed immediately and appropriately, so that an excellent discharge of liquid (ink) especially in response can be attained and therefore this pulse-shaped signal is more preferable.

Such is an appropriate pulse-shaped drive signal as described in U.S. Pat. No. 4,463,359 and U.S. Pat. No. 4,345,262. Meanwhile, if the conditions described in U.S. Pat. No. 4,313,124, an invention related to the temperature rise rate on the heat acting surface mentioned above, is adopted, a further excellent recording can be carried out.

As the arrangement of a recording head, in addition to a combined arrangement of a discharge port, a liquid passage and an electrothermal conversion body (linear liquid passage or rectangular liquid passage), an arrangement of a heat acting surface arranged in a crooked region, disclosed in U.S. Pat. No. 4,558,333 and U.S. Pat. No. 4,459,600 is usable. Besides, arrangements based on Japanese Patent Application Laid-Open No. 59-123670 disclosing an arrangement wherein a slot common to a plurality of electrothermal conversion bodies serves for the discharge port of an electrothermal conversion body and Japanese Patent Application Laid-Open No. 59-138461 disclosing an arrangement bringing an opening for absorbing a pressure wave of thermal energy in correspondence with the discharge section are usable.

In addition, a replaceable chip type recording head in which loading on the main apparatus body enables electric connection to the main apparatus body and feed of ink from the main apparatus body, or a cartridge type recording head in which an ink tank is provided in one piece on the main apparatus body itself.

And because of further stabilizing the recording operation, the addition of restoration means for a recording head, preliminary auxiliary means or the like to the above arrangement of an apparatus for making a halftone recording is preferable. To be specific, it includes the provision of capping means for a recording head, cleaning means, pressurization or suction means, preheating means comprising an electrothermal conversion body or a separate heating element or a combination of these, a preparatory discharge mode to effect other discharge than recording.

Furthermore, the recording mode of an apparatus for making a halftone recording is not only a recording mode by using leading colors such as black, but it may include one with a one-piece construction of recording heads or a plurality of combined recording heads and one of using an apparatus for making a halftone recording provided with a multicolor comprising different hues or at least one of full color by color mixing.

In the embodiment described above, description is based on the precondition that ink is a liquid, but even ink that solidifies at or below room temperatures or solid ink that softens or liquefies at room temperatures may be also used. Or, since generally in the ink-jet scheme, the temperature of ink itself is so controlled in the range of 30° C. to 70° C. that the viscosity of ink lies within the stable discharge limits, any ink that becomes liquid during the application of a use recording signal will do.

Besides, in order to positively prevent an increase in temperature due to generated thermal energy by using the thermal energy as energy for state change from the solid state to the liquid state of ink or to prevent the evaporation of ink, ink that is solidified while standing and liquefies by heating may be used. Anyway, the present invention is also applicable to the case of using such ink as liquefies first after the application of thermal energy, as seen in that ink liquefies by application of thermal energy in response to a recording signal and liquid ink is discharged, or in that ink begins to solidify at the time of arrival at a recording medium. In such cases, ink may be in the form of being opposed to an electrothermal conversion body while retained as a liquid or solid in cavities or through holes of a porous sheet described in Japanese Patent Application Laid-Open No. 54-56847 and Japanese Patent Application Laid-Open No. 60-71260. In the present invention, those executing the film boiling scheme mentioned above are the most effective to all of the above-mentioned ink types.

Still further, as aspects of an apparatus for making a halftone recording according to the present invention, not only those provided in one piece or separately as an image output terminal of information processing equipment such as computers, but those having a shape of copier combined with a reader or the like are also allowable.

Incidentally, the present invention is applicable to a system comprising a plurality of instruments or devices, or to an apparatus comprising one instrument or device. Needless to say, the present invention is applicable to a case where recording is attained by the supply of a program to a system or an apparatus. In this case, a storage medium for storing a program according to the present invention constitutes the present invention. And, by reading out the program from the storage medium to a system or an apparatus, the system or apparatus operates in a predetermined manner.

Incidentally, with the above embodiments, multivalued image data are divided into data corresponding to individual colors and binary value or multivalue processing is made according to the respective colors in a host computer, but the present invention is not limited to this and such a function may be incorporated into the main apparatus body. Alternatively, this embodiment may be so arranged as to transmit data expanded into print data from a host computer to an apparatus for making a halftone recording, rather than to output a record code from a host computer to an apparatus for making a halftone recording.

As described above, according to this embodiment, by the exchange of an ink cartridge or an ink tank, an apparatus for making a halftone recording can perform recording in exchange between ink of different coloring matter concentrations. Alternatively, by modifying the printing amount or the maximum printing amount of ink during the recording according to the combination of ink coloring matter concentrations in cartridges with a change in ink concentration due to the exchange of a cartridge, the maximum amounts of color materials to be discharged on a recording medium is determined. Thus, a recording according to the sorts of recording media used for recording becomes implementable.

And, with this embodiment, for recording by using a color material of low coloring matter concentration, each pixel is chromatically decomposed into primary/secondary color components and the maximum printing amount of a color material is determined for each n-order color according to the class of a recording medium to be used, not by increasing the maximum printing amount of ink having a low coloring matter concentration simply in dependence on the ratios of color concentrations.

On making the most of this function, a recorded image having substantially same optical reflection density as with those recorded by using color materials of high coloring matter concentration both in primary and in secondary colors can be obtained even by using color materials of low coloring matter concentration.

This embodiment is basically characterized in that even in using color materials of different coloring matter concentrations, the amount of coloring matter per area on a recording medium can be changed by the exchange of a cartridge or an ink tank.

Basically, by making the coloring matter density almost identical, it becomes possible to make the maximum concentration almost equal while reducing the grainy feeling.

And, according to this embodiment, while reducing the burden on a recording medium by suppressing the printing amount of ink to the recording medium, to cut the running cost becomes possible. Like these, since the printing amount of ink can be changed according to the coloring matter concentration of ink to be used and further the printing amount of ink can be finely controlled for each color, this embodiment is especially effective for a general-use ink-jet apparatus wherein a recording medium having a low limit for ink printing amount is used for printing.

The conception of coloristic performance signifies the coloring intensity of ink itself or the degree of coloring intensity in the depicted state on a recording medium.

It signifies the degree of coloring intensity in case of a chromatic color and that of lightness in case of an achromatic color. In such meaning, it may signify the dye concentration of ink in the case of using one and the same dye or paint.

And, for comparison in the state of printing on a recording medium, it may be the optical reflection density or the comparison of maximum saturation in substantially same hue. The so-called high coloring is positioned to an excellent coloristic performance. And ink is not limited to a liquid but may be a solid.

In this embodiment, an apparatus wherein ink is discharged onto a recording medium is disclosed as one aspect of apparatus for making a halftone recording, but the present invention is not limited to this but is also applicable to other apparatuses such as, e.g., thermosensible type or sublimation type color recorders. To sum up, all printers for forming an image by using dots are included in the category of the present invention.

As detailed above, according to the present invention, a high quality halftone recording with a reduced grainy feeling can be carried out by using the minimum sorts of ink for each color without lowering the true resolving power.

As described above, according to the present invention, there is an effect that cartridges for storing color materials of different concentrations can be used in exchange and a high quality image can be recorded by the exchange of these cartridges.

According to the present invention, recording by varying the concentrations of color materials to be used reduces a grainy feeling greatly, thereby enabling a high quality image to be recorded.

In addition, according to the present invention, there is an effect that an appropriate ink printing amount can be established according to the concentrations of color materials used for recording an image and sort of recording medium.

Furthermore, according to the present invention, there is an effect that in recording by using a color material of low concentration, controlling the used amount of the relevant color material enables a flood on a recording medium to be prevented and an image of substantially same optical reflection density to be obtained as with the use of a color material of high concentration.

What is claimed is:

1. An apparatus for making a halftone recording by employing three or more types of color materials, comprising three or more types of color materials which have respective concentrations, wherein each type of the color materials provides, when recording on a recording medium having a first lightness, a recorded region having a second lightness, and wherein a difference between the first lightness and the second lightness is not more than 35, the lightness being measured according to the definition of CIE 1976 psychological measurement lightness using a standard illuminant D65 as a light source.

2. The apparatus according to claim 1, wherein each of said color materials has at least two concentration grades which provide recorded regions having respective lightnesses, difference between the lightnesses being set within 35.

3. The apparatus for making a halftone recording according to claim 1 or 2, wherein each of the three types of color materials has at least one concentration grade and is capable of recording at a recording lightness of not lower than 60.

4. The apparatus for making a halftone recording according to claim 3, wherein all the three types of color materials record at a recording lightness of not lower than 60.

5. The apparatus for making a halftone recording according to claim 1, wherein said recording lightness is a recorded dot lightness on a recording medium.

6. The apparatus for making a halftone recording according to claim 1, wherein said recording lightness is a recording lightness at a recorded region of a 100% solid printing by said apparatus on a recording medium.

7. The apparatus for making a halftone recording according to claim 1, wherein the lightness of said recording medium ranges from 75 to 95.

8. The apparatus for making a halftone recording according to claim 1, wherein recording of said color materials is made by adherence of droplets of the color materials to said recording medium.

9. The apparatus for making a halftone recording according to claim 1, wherein the three types of color materials are color recording inks other than a black ink.

10. A process for making a halftone recording, comprising providing three or more color materials which have respective concentrations, and adding the color materials on a recording medium having a first lightness, wherein each type of the color materials provides, when recording on the recording medium, a recorded region having a second lightness, and wherein a difference between the first lightness and the second lightness is not more than 35, the lightness being measured according to the definition of CIE 1976 psychological measurement lightness using a standard illuminant D65 as a light source.

11. The process according to claim 10, wherein each of the color materials has at least two concentration grades which provide recorded regions having respective lightnesses, a difference between the lightnesses being set within 35.

12. The process according to claim 10 or 11, wherein one of the three types of color materials has at least one concentration grade and is capable of recording at a recording lightness of not more than 60.

13. The process according to claim 12, wherein all the three types of color materials are capable of recording at a recording lightness of not more than 60.

14. The process according to claim 10, wherein said recording lightness is a recorded dot lightness on a recording medium.

15. The process according to claim 10, wherein said recording lightness is a recording lightness at a recorded region of a 100% solid printing by an apparatus for making a halftone recording on a recording medium.

16. The process according to claim 10, wherein a lightness of said recording medium ranges from 75 to 95.

17. The process according to claim 10, wherein recording of said color materials is made by adherence of droplets of the color materials to said recording medium.

18. The process according to claim 10, wherein said three types of color materials are color recording inks other than a black ink.

19. An ink tank used in an apparatus for making a halftone recording, the ink tank holding three or more types of color materials which have respective concentrations, wherein each type of color materials provides, when recording on the recording medium having a first lightness, a recorded region having a second lightness, and wherein a difference between the first lightness and the second lightness is not more than 35, the lightness being measured according to the definition of CIE 1976 psychological measurement lightness using a standard illuminant D65 as a light source.

20. The ink tank according to claim 19, wherein each of the color materials has at least two concentration grades which provide recorded regions having respective lightnesses, a difference between the lightnesses being set within 35.

21. The ink tank according to claim 19 or 20, wherein one of the three types of color materials has at least one concentration grade and is capable of recording at a recording lightness of not more than 60.

22. The ink tank according to claim 21, wherein all the three types of color materials are capable of recording at a recording lightness of not more than 60.

23. The ink tank according to claim 19, wherein said recording lightness is a recorded dot lightness on a recording medium.

24. The ink tank according to claim 19, wherein said recording lightness is a recording lightness of the recorded region of a 100% solid printing by an apparatus for making a halftone recording on a recording medium.

25. The ink tank according to claim 19, wherein the lightness of said recording medium ranges from 75 to 95.

26. The ink tank according to claim 19, wherein recording of said color materials is made by adherence of droplets of the color materials to said recording medium.

27. The ink tank according to claim 19, wherein said three types of color materials are recording inks other than a black ink.

28. The ink tank according to claim 19, wherein an ID information indicating the types of color materials kept therein is so arranged as capable of being outputted.

29. A head cartridge that uses an ink tank according to claim 19, equipped with a recording head for ejecting the color materials fed from said ink tank.

30. A head cartridge that uses an ink tank according to claim 19, equipped with a recording head for ejecting the color materials fed from said ink tank and so arranged that the ID information indicating the types of color materials kept therein is outputted.

31. An ink-jet recording apparatus that uses a head cartridge according to claim 30 for recording, comprising:
a loading section for exchangeably loading said head cartridge; and
a printing amount control section for identifying a class of a color material kept in the loaded head cartridge with an ID information outputted by said head cartridge loaded in said loading section and deciding the driving conditions of said recording head corresponding to the identified class of the color material.

32. An ink-jet recording apparatus that uses an ink tank according to claim 28 for recording, comprising:
a recording head for ejecting ink kept in said ink tank; and
a printing amount control section for identifying the class of a color material kept therein with an ID information outputted by said ink tank and determining driving conditions of said recording head corresponding to the identified type of the color material.

33. An ink-jet recording apparatus comprising:
a loading section for loading a first ink-jet head for ejecting a first ink of first coloristic performance and a second ink-jet head for ejecting a second ink of second coloristic performance in a mutually exchangeable manner; and
drive means for providing drive conditions to the ink-jet head loaded on said loading section.

34. The ink-jet recording apparatus according to claim 33, further comprising:
modification means for forming a surface density with a second ink, corresponding to a coloristic surface density formed with a first ink, and modifying the drive conditions according to a ratio of the second coloristic performance with the second ink to the first coloristic performance with the first ink.

35. An apparatus for making a halftone recording by employing three of more types of coloring materials, wherein the three of more types of color materials have respective concentrations, each type of the color materials providing a respective recorded region having a regional lightness, a lightness difference between the regional lightnesses of the regions being not more than 35, the lightness being measured according to the definition of CIE 1976 psychological measurement lightness using a standard luminant D65 as a light source.

36. An apparatus for making a halftone recording by employing three types of color materials of yellow, magenta and cyan have respective concentrations, wherein each types of color materials of magenta and cyan contains color materials which provide a recorded region having a second lightness when each type of color materials of magenta and cyan is recorded on a recording medium having a first lightness, a difference between the first lightness and the second lightness being not more than 35, the lightness being measured according to the definition of CIE 1976 psychological measurement lightness using a standard illuminant D65 as a light source.

37. An apparatus for making a halftone recording by employing three types of color materials of yellow, magenta and cyan which have respective concentrations, wherein the color materials provide recorded regions having respective lightnesses, a lightness difference between the recorded regions is not more than 35, the lightness being measured according to the definition of CIE 1976 psychological measurement lightness using a standard illuminant D65 as a light source.

38. An apparatus for making a halftone recording by employing at least two types of color materials of magenta and cyan which have respective concentrations wherein each type of the color materials provides, when recording on the recording medium having a first lightness, a recorded region having a second lightness, and wherein a difference between the first lightness and the second lightness is not more than 35, the lightness being measured according to the definition of CIE 1976 psychological measurement lightness using a standard illuminant D65 as a light source.

39. An apparatus for making a halftone recording by employing at least two types of color materials of magenta and cyan each of which having at least two concentration grades, wherein the color materials having adjacent concentration grades provide recorded regions having respective lightness, a lightness difference between the recorded regions is not more than 35, the lightness being measured according to the definition of CIE 1976 psychological measurement lightness using a standard illuminating light D65 as a light source.

40. A process for making a halftone recording by employing three types of color materials each of which having at least two concentration grades, wherein the color materials having adjacent concentration grades provide recorded regions having respective lightness, a lightness difference between the recorded regions is not more than 35, the lightness being measured according to the definition of CIE 1976 psychological measurement lightness using a standard illuminating light D65 as a light source.

41. A process for making a halftone recording by employing at least three types of color materials of yellow, magenta and cyan, each of which having at least one concentration grade, wherein each type of color materials of magenta and cyan contains color materials which provide a recorded region having a regional lightness when each type of color materials of magenta and cyan having the lowest concentration is recorded on a recording medium having a first lightness, a difference between the first lightness and the regional lightness of the recorded region being not more than 35, the lightness being measured according to the definition of CIE 1976 psychological measurement lightness using a standard illuminating light D65 as a light source.

42. A process for making a halftone recording by employing at least three types of color materials of yellow, magenta and cyan, each of which having at least two concentration grades, wherein the color materials having adjacent concentration grades provide recorded regions having respective lightness, a lightness difference between the recorded regions is not more than 35, the lightness being measured according to the definition of CIE 1976 psychological measurement lightness using a standard illuminating light D65 as a light source.

43. A process for making a halftone recording by employing at least two types of color materials of magenta and cyan, each of which having at least one concentration grade, wherein each type of color materials of magenta and cyan contains color material which provide a recorded region having a regional lightness when each type of color materials of magenta and cyan having the lowest concentration is recorded on a recording medium having a first lightness, a difference between the first lightness and the regional lightness of the recorded region being not more than 35, the lightness being measured according to the definition of CIE 1976 psychological measurement lightness using a standard illuminating light D65 as a light source.

44. A process for making a halftone recording by employing at least two types of color material of magenta and cyan, each of which having at least two concentration grades, wherein the color material having adjacent concentration grades provide recorded regions having respective lightness, a lightness difference between the recorded regions is not more than 35, the lightness of the recorded region is not more than 35, the lightness being measured according to the definition of CIE 1976 psychological measurement lightness using a standard illuminating light D65 as a light source.

45. The process according to any of claims 40, 42 and 44, wherein the color material of the highest concentration attain an optical density of not lower than 1.0 at a 100% solid printing.

46. The process according to any of claims 40, 42 and 44, wherein the color material of the highest concentration attain an optical density of not lower than 1.4 at a 100% solid printing.

47. The process according to any of claims 40, 42 and 44, wherein at least either one of the printing amount of the color material or the maximum printing amount onto a recording medium is modified according to the concentration of a color material.

48. A process for making an image, comprising the steps of:
  providing at least three types of color materials of yellow, magenta and cyan, each of which having at least two concentration grades, and
  forming an image on a recording medium by employing the color materials, the image consisting of primary colors made by each of the color materials, and secondary colors made by mixture of the different types of color materials,
  wherein the color materials having adjacent concentration grades provide recorded regions having respective lightness, a lightness difference between the recorded regions is not more than 35, the lightness being measured according to the definition of CIE 1976 psychological measurement lightness using a standard illuminating light D65 as a light source, and wherein the forming step comprises
    a step of for subjecting color separation of each of pixels constituting the image into primary color components, and
    a step of modifying maximum printing amounts of the color materials being added onto the recording medium according to the concentration grades of the color materials as for the primary color components resulting from the color-separation.

* * * * *

UNITED STATES PATENT AND TRADEMARK OFFICE
CERTIFICATE OF CORRECTION

PATENT NO. : 6,244,681 B1
DATED : June 12, 2001
INVENTOR(S) : Yano et al.

It is certified that error appears in the above-identified patent and that said Letters Patent is hereby corrected as shown below:

Title page,
Item [56] References Cited, U.S. PATENT DOCUMENTS,
"Rezanka et al." should read -- Rezanka --.

Column 1,
Line 63, "be also" should read -- also be --.

Column 2,
Line 10, "a high" should read -- high --.

Column 3,
Line 27, "lass" should read -- class --.

Column 5,
Line 15, "material" should read -- materials --.

Column 6,
Line 58, "of" should read -- of a --.

Column 8,
Line 62, "discharge" should read -- discharges --.

Column 9,
Line 36, "recorded" should read -- recording --.

Column 10,
Line 57, "be also" should read -- also be --.
Line 67, "in-such" should read -- in such --.

Column 11,
Line 26, "even-for" should read -- even for --.
Line 66, "are" should read -- is --.

Column 12,
Line 59, "same" should read -- the same --.

UNITED STATES PATENT AND TRADEMARK OFFICE
CERTIFICATE OF CORRECTION

PATENT NO. : 6,244,681 B1
DATED : June 12, 2001
INVENTOR(S) : Yano et al.

It is certified that error appears in the above-identified patent and that said Letters Patent is hereby corrected as shown below:

Column 13,
Line 57, "be also" should read -- also be --.
Line 63, "3-time" should read -- 3-times --.
Line 67, "to" should be deleted.

Column 14,
Line 8, "and-pale" should read -- and pale --.
Line 18, "The.compositions" should read -- The compositions --.

Column 15,
Line 22, "and-different" should read -- and different --.
Line 38, "component" should read -- components --.
Line 47, "low-" should read -- low --.

Column 16,
Line 8, "the-printer" should read -- the printer --.
Line 32, "the-ink-" should read -- the ink --.
Line 36, "203;" should read -- 203, --.

Column 18,
Line 20, "RGB-colors," should read -- RGB colors, --.
Line 41, "bits" should read -- bit --.

Column 19,
Line 21, "a.half" should read -- a half --.
Line 30, "with.a" should read -- with a --.

Column 20,
Line 2, "contrast" should read -- contrast to --.

Column 21,
Line 36, "of-grading." should read -- of grading. --.

Column 22,
Line 6, "the" should read -- this --.
Line 7, "signal" should read -- signals --.
Line 47, "above-drawings" should read -- above drawings --.

UNITED STATES PATENT AND TRADEMARK OFFICE
CERTIFICATE OF CORRECTION

PATENT NO. : 6,244,681 B1
DATED : June 12, 2001
INVENTOR(S) : Yano et al.

It is certified that error appears in the above-identified patent and that said Letters Patent is hereby corrected as shown below:

Column 23,
Line 50, "decide" should read -- decided --.
Line 52, "to.the" should read -- to the --.

Column 24,
Line 18, "into" should be deleted.
Line 25, "necessary" should read -- necessary as --.

Column 25,
Line 2, "S 49" should read -- S49 --.

Column 26,
Line 20, "be also" should read -- also be --.

Column 32,
Line 43, "grades, and" should read -- grades; and --.
Line 57, "for" should be deleted.

Signed and Sealed this

Twenty-sixth Day of March, 2002

Attest:

*Attesting Officer*

JAMES E. ROGAN
*Director of the United States Patent and Trademark Office*